(12) United States Patent
Kawaguchi et al.

(10) Patent No.: US 8,291,008 B2
(45) Date of Patent: Oct. 16, 2012

(54) INFORMATION IMAGE USE SYSTEM USING INFORMATION IMAGE

(75) Inventors: Kunio Kawaguchi, Kanagawa (JP); Yohsuke Igarashi, Kanagawa (JP); Masako Aizawa, Tokyo (JP); Fumio Tsuyama, Kanagawa (JP); Ryota Makiyama, Tokyo (JP); Mariko Noda, Kanagawa (JP); Seiji Kanai, Kanagawa (JP); Tomoaki Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1378 days.

(21) Appl. No.: 10/089,400

(22) PCT Filed: Jul. 25, 2001

(86) PCT No.: PCT/JP01/06411
§ 371 (c)(1),
(2), (4) Date: Aug. 12, 2002

(87) PCT Pub. No.: WO02/10920
PCT Pub. Date: Feb. 7, 2002

(65) Prior Publication Data
US 2003/0020745 A1 Jan. 30, 2003

(30) Foreign Application Priority Data

Jul. 31, 2000 (JP) .............................. P2000-231788
Oct. 31, 2000 (JP) .............................. P2000-333038
Oct. 31, 2000 (JP) .............................. P2000-333039

(51) Int. Cl.
*G06F 15/16* (2006.01)
(52) U.S. Cl. ........................................ 709/203; 709/219
(58) Field of Classification Search .................. 709/223, 709/203, 219; 705/14, 26, 27, 37, 400; 707/6
See application file for complete search history.

(56) References Cited

U.S. PATENT DOCUMENTS

| | | | |
|---|---|---|---|
| 5,379,374 A * | 1/1995 | Ishizaki et al. | 715/759 |
| 5,813,007 A | 9/1998 | Nielsen | |
| 5,848,397 A * | 12/1998 | Marsh et al. | 705/14 |
| 5,948,061 A * | 9/1999 | Merriman et al. | 709/219 |
| 5,963,964 A | 10/1999 | Nielsen | |

(Continued)

FOREIGN PATENT DOCUMENTS

EP 0 833 258 4/1998

(Continued)

*Primary Examiner* — Minh-Chau Nguyen
(74) *Attorney, Agent, or Firm* — Frommer Lawrence & Haug LLP; William S. Frommer; Thomas F. Presson

(57) ABSTRACT

This invention relates to information operation carried out between information processing apparatuses such as computer, etc. mutually connected through network such as internet, etc. More particularly, this invention relates to an information picture utilization system where there is used "information picture" in which picture information and related information for causing an operator to carry out a predetermined operation on the basis of the picture information are caused to be one handling unit, and a system for allowing notification to server carried out when processing operation based on related information included in information picture is carried out to have lifetime to thereby realize lowering of communications traffic taking place when information pictures are distributed and duplications are increased with time. In more practical sense, this invention relates to a system in which lifetime information is included in information picture itself, a system in which lifetime control is carried out on the basis of history at client, and a system in which lifetime control is carried out at the server side.

2 Claims, 13 Drawing Sheets

U.S. PATENT DOCUMENTS

| | | | | |
|---|---|---|---|---|
| 6,009,409 A * | 12/1999 | Adler et al. | ............... | 705/14 |
| 6,041,360 A | 3/2000 | Himmel et al. | | |
| 6,285,987 B1 * | 9/2001 | Roth et al. | ............... | 705/27 |
| 6,308,202 B1 * | 10/2001 | Cohn et al. | ............... | 709/217 |
| 6,366,298 B1 * | 4/2002 | Haitsuka et al. | ............... | 715/736 |
| 6,487,538 B1 * | 11/2002 | Gupta et al. | ............... | 705/14 |
| 7,039,599 B2 * | 5/2006 | Merriman et al. | ............... | 705/14 |
| 7,136,875 B2 * | 11/2006 | Anderson et al. | ............... | 1/1 |
| 7,146,567 B1 * | 12/2006 | Duczmal et al. | ............... | 715/736 |
| 7,188,085 B2 * | 3/2007 | Pelletier | ............... | 705/50 |
| 7,356,477 B1 * | 4/2008 | Allan et al. | ............... | 705/14.4 |
| 2003/0110130 A1 * | 6/2003 | Pelletier | ............... | 705/50 |
| 2007/0005428 A1 * | 1/2007 | Jacobs et al. | ............... | 705/14 |

FOREIGN PATENT DOCUMENTS

WO    WO 00/23913    4/2000

* cited by examiner

DEPTH SET PAGE

CLIENT ID:13524521545583 — 2401

PLEASE MAKE INFORMATION PICTURE UPDATING DEPTH SET FROM THIS — 2402

5

REGISTRATION  CLEAR — 2403

2405  2406  2404

| CLIENT ID (2501) | INFORMATION PICTURE ID (2502) | REGISTRATION DATE (2503) | OTHERS (2504) |
|---|---|---|---|
| 13524521545583 | 521425487.jpg | 2000/9/6 12:30 | |
| ... | ... | ... | ... |
| | | | |

INFORMATION IMAGE USE SYSTEM USING INFORMATION IMAGE

TECHNICAL FIELD

This invention relates to an information picture utilization system, etc. using "information picture" in which picture information and related information which allows an operator to cause a predetermined operation on the basis of the picture information are caused to be one handling unit, and more particularly to a system in which lifetime is given to notification to server carried out when processing operation based on related information included in information picture is carried out to thereby realize lowering of communications traffic expected when information pictures are distributed and duplications are increased with time.

BACKGROUND ART

In recent years, quantity of information provided from many and unspecified information opening server connected through internet becomes vast. User can operate information terminal equipment such as personal computer, etc. connected to internet to provide access to a desired information opening server to obtain desired information. In the so-called WWW (World Wide Web) environment realized through such internet, for the server side serving as information provider, it has become important how to efficiently offer information that the server side provides to many users.

As a guidance method of user on internet, button in which address of information open server is related to picture file, etc., e.g., Banner advertisement, etc. is known. User carries out a specific operation such as click with respect to Banner advertisement so that he is easily guided to a predetermined information without troublesome operation such that character string such as URL, etc. is inoutted. However, such Banner advertisement can only guide user to destination of individual link merely related to button, and is such that management of the button is difficult. For this reason, the inventors of this application have proposed the so-called "information picture" in which picture information and related information which allows user to cause a predetermined operation on the basis of the picture information (e.g., the Japanese Patent Application No. 083291/2000).

In this information picture, since picture information is not caused to exist alone as picture file, but picture information and related information represented by link, etc. are caused to exist as one handling unit, it is easy to carry out management of picture information. Moreover, if identifier representing one information picture is caused to be included or similar operation is carried out to have ability to specify respective information pictures and software which processes related information is caused to communicate with server by using identifier corresponding thereto, it is also possible to carry out pursuit management of utilization circumstances at the user side. Further, since information picture is adapted so that plural operations can be collectively handled in the state where plural they are represented by one picture, user is permitted to be cyclically guided with respect to plural information, or management of plural information is carried out as a group to have ability to guide user with respect to the group. Accordingly, such information picture can be extremely effective user guidance means for information provider.

By using such information picture, information provider is permitted to guide more users with respect to own information. For example, in the case where information provider is seller of a certain article, such an approach is employed to utilize various information relating to goods by using information picture to appeal to user who is consumer to thereby realize distinction with respect to goods of rival seller, thus making it possible to advantageously promote selling strategy of goods. Further, if pursuit management of utilization circumstances of picture information as described above is jointly used, it is also possible to acquire valuable marketing information which reflects trend of customer for information provider. Since the information picture has high economical additional value as stated above, there exist for information provider needs to guide user to desired information by making use of information picture to advantageously develop own business even if money is required.

However, the content of information that information provider provides through related information of information picture would be changed as occasion demands. Accordingly, when operation based on related information incidental to one information picture is indefinitely permitted, there is the possibility that information provider may guide user to information that he does not intend.

Moreover, in some systems, in order to always provide fresh information although of course necessary in the case of carrying out pursuit management, in addition to client computer that user operates, server computer which communicates with the client computer is used.

Moreover, if it is recorded in the server computer that respective client computers record specific information picture, it also becomes possible to timely update information picture.

Further, if such an approach is employed to carry out notification to server computer when the client computer makes reference to information picture, it is possible to more grasp information picture in which reference is made in that client computer substantially on the real time basis. This contributes to management easiness.

However, in system in which so far as operation log relating to information picture in which management has been already unnecessary is notified, there has appeared the possibility that useless traffic takes place and excessive load is applied to the system.

More practical management technique for suppressing increase in load of such network is required.

DISCLOSURE OF THE INVENTION

This invention has been proposed in the background as described above, and aims at maintaining efficient information communication in which feature of the network is exhibited, and preventing the trend in which communications traffic is increased in a manner of geometrical series in accordance with the number of clients and time.

The essence of this invention resides in that in the case where communication with various servers is carried out on the basis of information picture, concept of communication lifetime is introduced in advance with respect to that information picture. In regard to information picture which exceeds life time, such an approach is employed to cease communication or limit communication to thereby realize reduction of total communications traffic. Thus, the inventors of this application have made three kinds of inventions on the basis of this concept in order to carry out this limitation of communication.

The first and second techniques both relate to technique for limiting communications traffic at the client side. Among them, with respect to the first technique, limit information relating to lifetime is added to information picture to limit quantity (traffic) of communication transmitted from client on the basis of this limit information. Moreover, with respect to the second technique, history relating to recording/updating of information picture is stored at the client side to limit quantity (traffic) transmitted from client on the basis of this history.

In the third technique, quantity (traffic) of communication transmitted from server is limited on the basis of information relating to information picture which is grasped (is caused to undergo recording/management) at the server side.

BEST MODE FOR CARRYING OUT THE INVENTION

Figure 1:
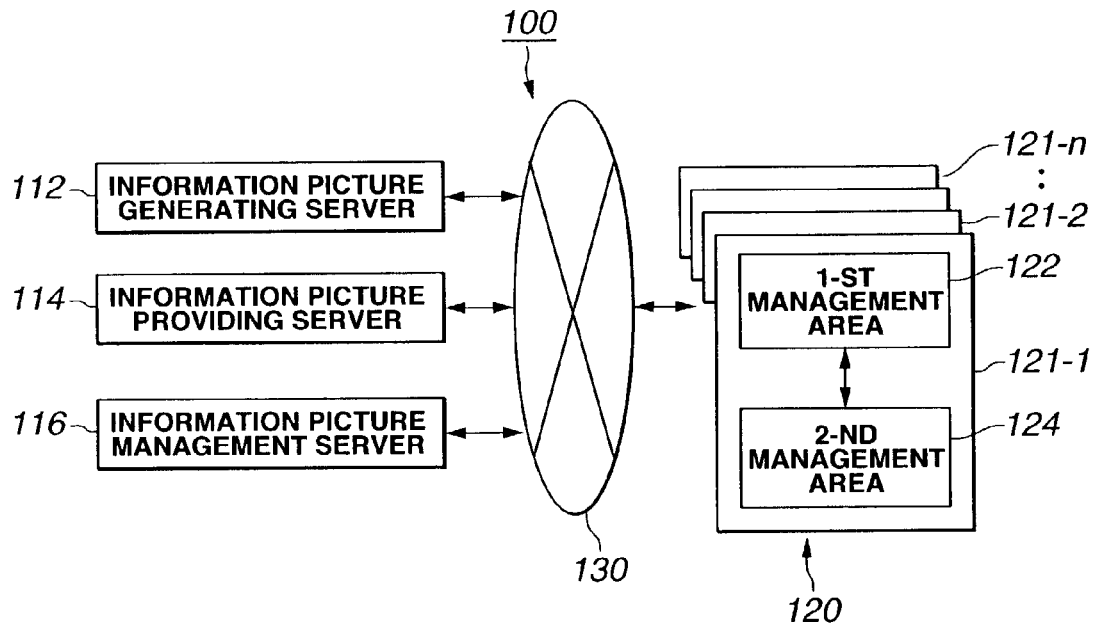
FIG. 1 is a schematic view showing system common to respective embodiments of this invention.

Explanation will now be given in connection with common concept used in this invention, and explanation will be then given in connection with three techniques of the above-described this invention. The following explanations will be given in order as described below.
1. Common Concept
   1.1. Information provider
   1.2. Picture information
   1.3. Information picture
      1.3.1. Picture information employing "GIF" form and the case where related information is caused to be independent.
      1.3.2. Picture information employing "GIF" form and the case where related information is buried in picture information.
   1.4. Information picture handling interface at client computer
      1.4.1. Example of graphic image suitable for computer
      1.4.2. Another example of graphic image suitable for computer
      1.4.3. A further example of graphic image suitable for digital television or PDA
   1.5. Example of system configuration common to the embodiments of this application
   1.6. Utilization relationship of information picture between server and client
   1.7. Communication between first management area and second management area
2. With respect to the embodiment for limiting communication at the client side
   2.1. Case where communication is limited on the basis of limit information added to information picture
      2.1.1. Configuration of information picture
      2.1.2. Configuration and operation of client
      2.1.3. Example of description of time limit information by information picture generating server
      2.1.4. Example of operation of time limit information 2.1.5. Example of charging system using time limit information
2.2. Case where communication is limited on the basis of history from the time when information picture is registered at client
   2.2.1. Configuration of information picture management server
   2.2.2. Configuration of client
   2.2.3. Example of operation of client
   2.2.4. Predetermined number at updating history recording section of client
3. Case where communication is limited on the basis of information which is caused to undergo management at the server side
  3.1. System configuration
   3.1.1. Information picture management server
   3.1.2. Client
    3.1.2.1. Example of configuration of client
    3.1.2.2. Example of operation of client
  3.2. Scenario of information picture registration
  3.3. Information picture updating depth setting
4. Others (1. Common Concept)

Explanation will now be given in connection with expressions commonly used in this invention, outline of information picture, function in operation of an operator and the like.

(1.1. Information Provider)

"Information provider" is information terminal such as computer, etc. which generates information picture in a manner to guide user with respect to desired information to have ability to register that information picture with respect to information opening server through network or other means. For example, information terminal, etc. that goods seller who attempts to provide information relating to goods through internet to sell corresponding goods possesses corresponds to the "information provider".

(1.2. Picture Information)

"Picture information" is information permitted to be specified on the basis of picture specific information, e.g., file name or identification information internally buried, etc., and acts in such a manner that "picture information" is displayed as picture image on information display unit serving as client.

(1.3. Information Picture)

The above-mentioned "picture information" and "information picture" which are used in this invention are clearly different concept.

The "information picture" is the concept in which related information which forms basis to cause a predetermined operation when specific operation instruction is given and picture information are caused to be one handling unit, and is adapted so that work such as transmission on the network, etc. can be realized by single handling processing. In this example, the specific operation instruction is given by an operator, and the "operator" is a person who operates picture information on the terminal such as client computer, etc. and may be registered user himself who uses information picture processing means or may be other person.

The "predetermined operation" is adapted so that there are included processing of all information which relates to information that related information includes and which can be realized at the terminal, and, for example, there are included an operation to cyclically guide terminal with respect to plural information, and/or to guide in parallel the terminal with respect to information which has been caused to undergo management as one group.

The "related information" is information including information which forms basis of corresponding operation in the case where an operator of client is caused to visually recognize picture image to allow the operator to carry out specific operation with this picture image being as clue. In more practical sense, the "related information" is information related to picture information. For example, in the case where there is a need to allow the operator of client to make reference to information existing in specific server, information for specifying that information (URL or IP address, etc.) corresponds to the "related information". Moreover, in the case where there is a need to operate specific program, the related information may be corresponding program name or program itself. For example, the related information may be indication information for acquiring new picture information from server, etc.

In this case, as information for specifying information, there may be information for specifying information picture file itself, or there may be URL of page which gives clue of acquisition of information picture.

As a matter of course, it is needless to say that when there exists information which is desired to transfer together along with information of picture information in addition to information as described above, the related information may be information picture including such information. Also in the explanation of this invention, with respect to information in which information relating to lifetime is caused to be included in information picture, special area is provided in the information picture to include such information, or such information is caused to be included in the form of water mark.

In more practical sense, the information picture adopts configuration as described below.

(1.2.1. Case where Corresponding Information is Picture Information Employing "GIF" Form and Related Information is Caused to be Independent)

Here, explanation will be given by taking an example of picture image of GIF form. Of course, with respect to format of picture information, it is sufficient to use any form such as PNG, JPG, etc. in addition to GIF form which will be described below.

Figure 3:
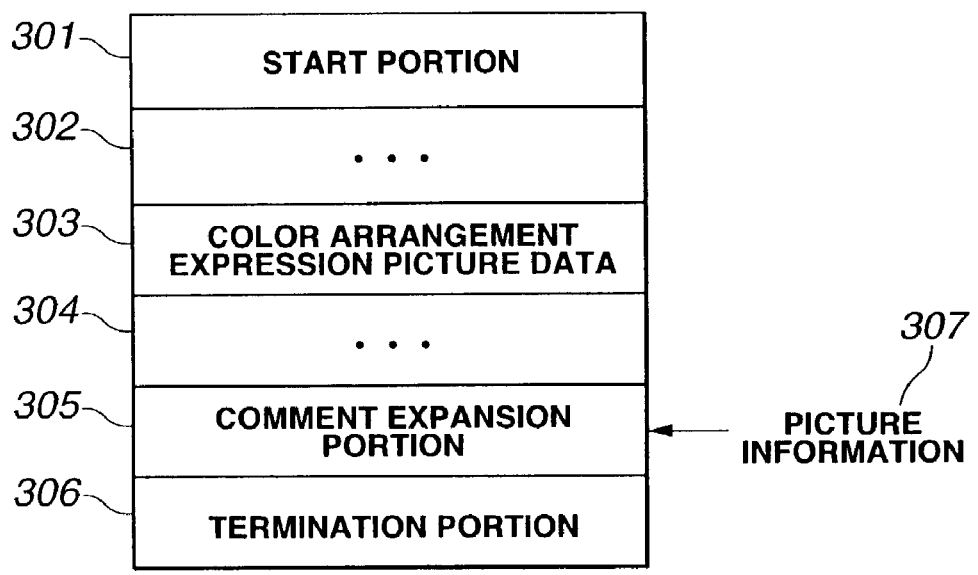
FIG. 3 is a view showing format of information picture in which related information is buried.

FIG. 3 is a view illustrating format of information picture in which related information is buried.

In this example, as picture information, picture image of GIF format is taken as an example. It is to be noted that, with respect to the format, even if GIF form is not employed, it is sufficient to adopt JPG form or PCX form, etc.

Start portion 301 is field provided for identifying that corresponding information is picture information of the GIF form, and character string of "GIF" and its version are assigned thereto.

Color arrangement expression picture data 303 is picture data in which pixels are arranged in order from left to right and from upper portion to lower portion. Here, in the case of GIF, such data is encoded by using LZW algorithm of variable length code.

Comment expansion portion 305 includes composition information which is not graphic information in GIF data stream. This is adapted so that all materials such as comments relating to graphic, name of maker concerned or explanation of the content, or kind of data which is not data of control or graphic can be included. In addition, in general indication, this portion is neglected.

Termination portion 306 indicates that this data stream is terminated or completed, and means that other parameter information, etc. does not continue after this termination portion.

Portion 302 between the start portion 301 and the color arrangement expression data 303, and portion 304 between the color arrangement expression picture data 303 and the comment expansion portion 305 include information except for these information. As an example, information including parameter which defines area of display unit necessary for picture image described from now such as picture width, picture height and color resolution, etc. are assigned.

Picture information 307 is disposed at the comment expansion portion 305 as it is, or is disposed after undergone processing such as ciphering, etc., and is collected as one picture information. Thus, as the result, picture information as data stream is adapted so that related information and/or identifier can be included therewithin.

While these explanations have been all given in the GIF format, even if picture form of other format is employed, when information is recorded in the area separated from picture information in a manner stated above, it is sufficient to employ such an approach.

(1.3.2. Case where Corresponding Information is Picture Information Employing "GIF" Form and Related Information is Burried in Picture Information)

Explanation will now be given with reference to FIG. 4 in connection with the form where related information is buried into picture information as another example.

Figure 4:
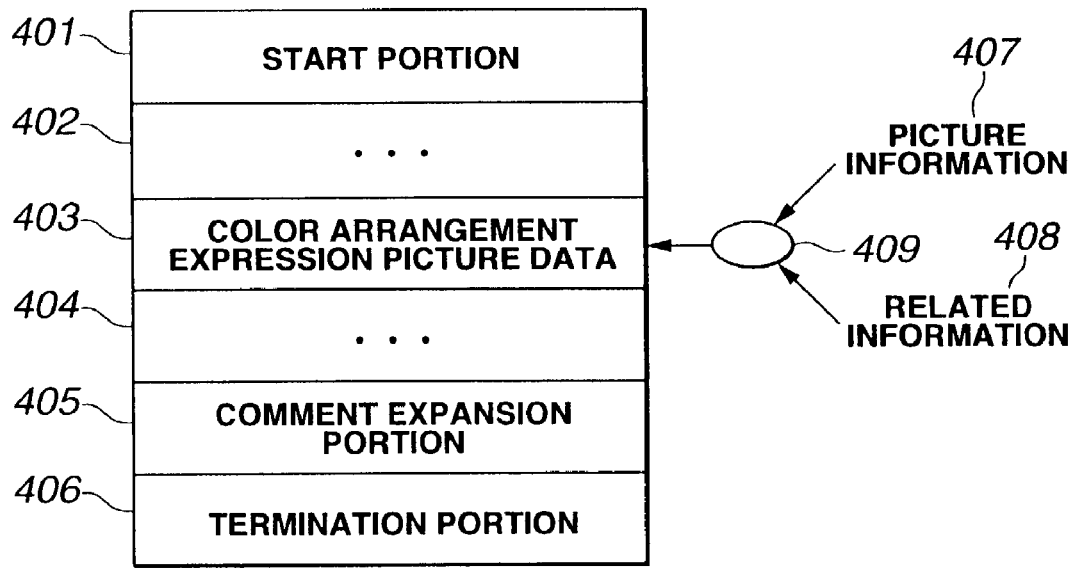
FIG. 4 is a view showing another format of information picture in which related information is buried.

FIG. 4 is a view illustrating another format of picture information in which related information is buried.

Also in this case, picture image of GIF format is exemplified as picture information. Also in this example, with respect to format, JPG form or PNG form, etc. may be employed even if GIF format is employed.

Start portion 401 is field provided for identifying that corresponding information is picture information of GIF form in a manner similar to the above, and character string of 'GIF' and its version are assigned thereto.

Color arrangement expression picture data 403 is placed where there is disposed picture data in which pixels are arranged in order from left to right and from upper portion to lower portion. In this example, picture information 407 and related information 408 are mixed in the form of water mark so that related information cannot be visually recognized as it is from a visual point of view, and picture information is caused to undergo mixing 409 so that it can be visually recognized as it is. In this case, information which has been caused to undergo mixing 409 in this way is encoded by using LZW algorithm of variable length code.

Comment expansion portion 405 includes composition information which is not graphic information in GIF data stream. Although this comment expansion portion 405 is field which is not particularly required in this example, information provider can utilize this portion by free definition if necessary.

Termination portion 406 indicates that corresponding data stream is terminated or completed, and means that other parameter information, etc. does not continue after this termination portion 406.

(1.4. Information Picture Handling Interface at Client Computer)

Explanation will now be given with reference to FIG. 5 to FIG. 8 in connection with the example of graphic image displayed in client according to the present invention.

(1.4.1. Example of Graphic Image Suitable for Computer)

Figure 5:
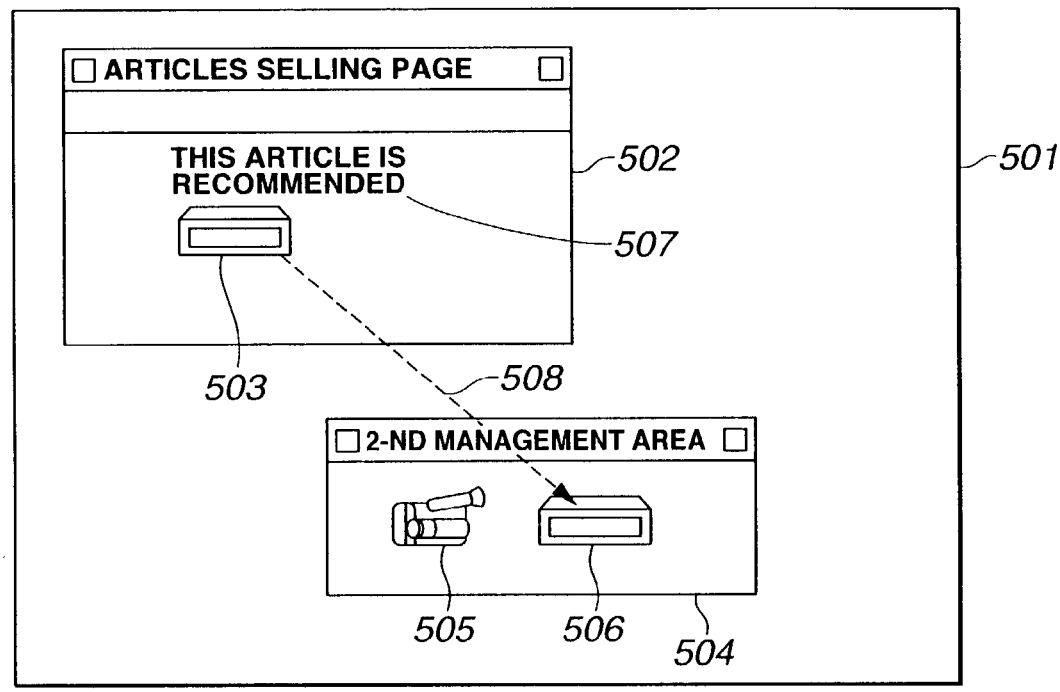
FIG. 5 is a view showing an example of user interface suitable for computer in utilization of information picture.

Initially, in the case where computer which supports OS in which graphic display can be made such as Windows 9x, Windows NT, Windows 2000Linux, etc. is used as display/operation terminal, since it is suitable to employ look and feel as shown in FIG. 5, this will be explained.

Display screen 501 is, e.g., Braun tub display surface, TFT liquid crystal screen or screen at display unit assembled in glasses attached to the human body, etc., and acts so that human being can visually grasp information from display/operation unit. It is to be noted that while the boundary portion of the display screen 501 is the outermost frame of the display device in this figure, this frame may be displayed within the display device.

One touch window 504 is window for displaying at least picture images (or picture information such as photograph, etc. which will be the same hereinafter) 505, 506, and when an operator of the terminal of this information display unit designates picture image 505 by operation means (not shown), the one touch window 504 can display at least one related information to start any processing based on that information, and in the case where there exist plural information, the one touch window 504 can select any one of them to start any processing based on that information. Namely, on the display screen 501, this one touch window 504 acts as special management area (corresponding to the display portion of the portion which has been explained as the second management area in this specification) for guiding specific operation with the picture images 505, 506 being as clue, and the operator of the terminal can realize new operation by using picture image displayed within this area as clue. Here, in the case where mouse is provided as operation means, it is preferable that pop-up menu is caused to appear by carrying out right click of the mouse to display related information here, and in the case where related information consists of plural information, one of these related information is specified by left click, etc.

Information providing window 502 is frame for displaying at least picture image 503, etc. When the operator of the terminal of this information display unit specifies picture image displayed within this frame by operation means (not shown), new picture image is supplemented and registered within the one touch window 504 on the basis of this operation.

At this time, as picture image supplemented within the one touch window 504, picture image specified and displayed within the information providing window 502 may be displayed as it is, and it is also sufficient to carry out change into other picture image as occasion demands. Within the information providing window 502, character information 507, etc. may be displayed in addition to picture image.

Namely, on the display screen 501, this information providing window 502 acts as management area (corresponding to the display portion of the portion which has been explained as the first management area in the description of this invention) for displaying picture image, etc. to allow the operator of terminal to be interested, and for carrying out operation to allow the operator of the terminal to specify picture image to thereby conduct registration with respect to the one touch window 504.

In this case, when pointing device such as mouse, etc. is provided at the operation means with respect to specific operation by the operator of display/operation terminal, it is desirable (508) to use user interface technique which is so called drag and drop to designate picture image desired to be registered by that pointer to move this picture image onto the one touch frame 502 to drop it. When this user interface is used, in the case where, e.g., internet explorer or netscape navigator is used as the information providing window 502, it is possible to obtain operation feel similar to other Windows program, therefore, this is advantageous.

(1.4.2. Another Example of Graphic Image Suitable for Computer)

Figure 6:
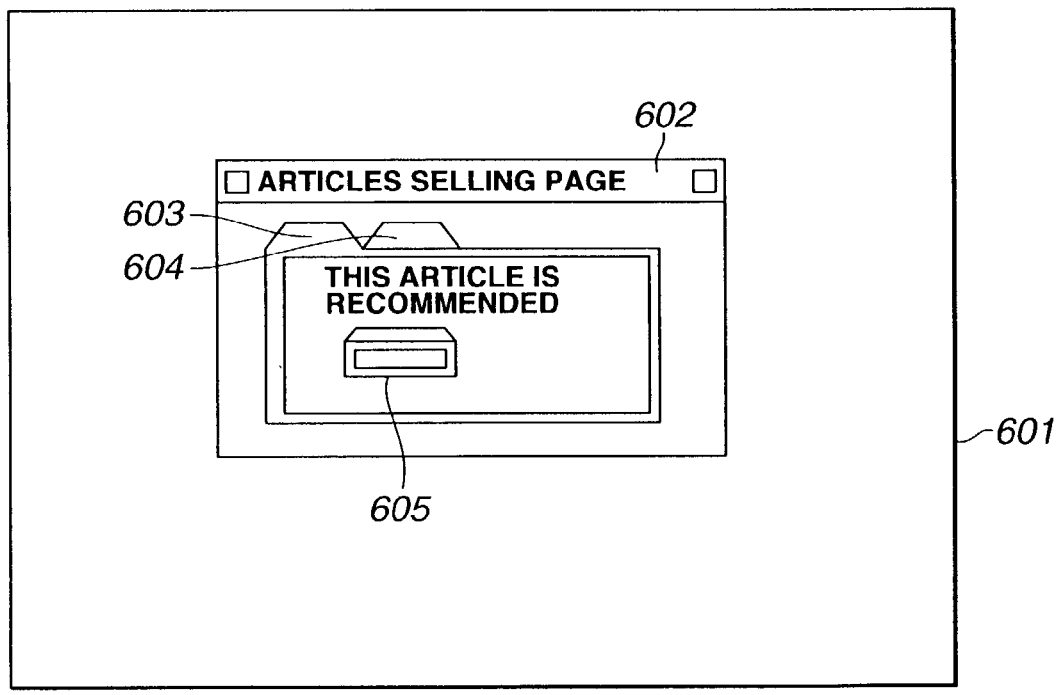
FIG. 6 is a view showing an example of user interface suitable for small computer such as PDA, etc. in utilization of information picture, wherein the first area is displayed.
Figure 7:
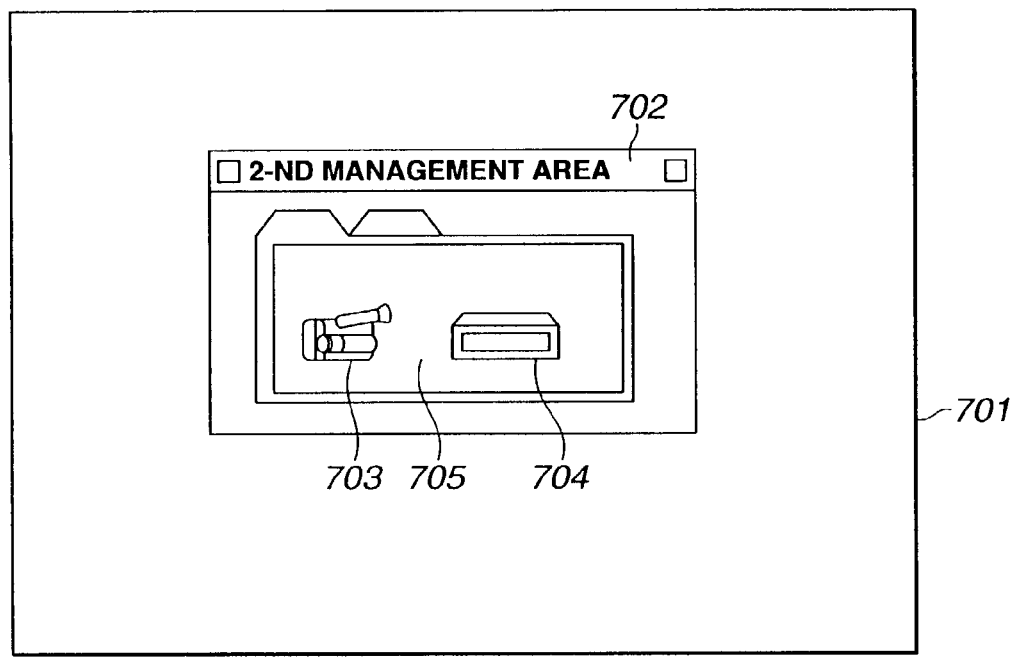
FIG. 7 is a view showing the example of user interface suitable for small computer such as PDA, etc. in utilization of information picture, wherein the second management area is displayed.

Moreover, as another example of interface, it is possible to use windows as shown in FIGS. 6 and 7.

Display screens 601, 701 act so that human being can visually grasp information from display unit, e.g., Braun tube display surface, TFT liquid crystal screen, and screen in display device assembled in glasses attached to human body, etc.

Information display/registration window 602 functions as interface for allowing an operator to carry out operation of display and registration of picture image obtained from information provider.

Information providing tab 603 is interface element for selecting management area provided within the area of the information display/registration window 602. When this information tab is active, picture image sent from information provider can be displaced within first management area 605. Further, when the operator of terminal of this information display unit specifies picture image displayed here by operation means (not shown), new picture image is supplemented to display plane (corresponding to the portion of display of portion which has been explained as "second management area" in the description of this invention) displayed when the one touch tab 604 is active.

The one touch tab 604 is interface element for selecting management area provided within the area of information display/registration window 602, and is adapted so that when this one touch tab 604 is caused to be active, it displays second management area to have ability to display, within that second management area 705, new picture image according to picture image in which registration is instructed within the first management area 605. Further, when the operator of terminal of this information display unit specifies picture image displayed here by operation means (not shown), the one touch tab 604 displays at least one related information on the basis of this operation to start any processing based on that information, and is operative so that in the case where there are plural related information, it selects any one of them to have ability to start any processing based on that information. Namely, this second management area 705 acts as management area (second management area) for guiding specific operation with picture images 703, 704 being as clue on information display/registration window 702, and the operator of terminal can realize new operation with picture image displayed within this area being as clue.

When this user interface is used, in the case where areas of display screens 601, 701 are small, or resolution of the picture is low, information display/registration operation can be completed within small display area. This is advantageous.

(1.4.3. Another Example of Graphic Image Suitable for Digital Television or PDA)

Figure 8:
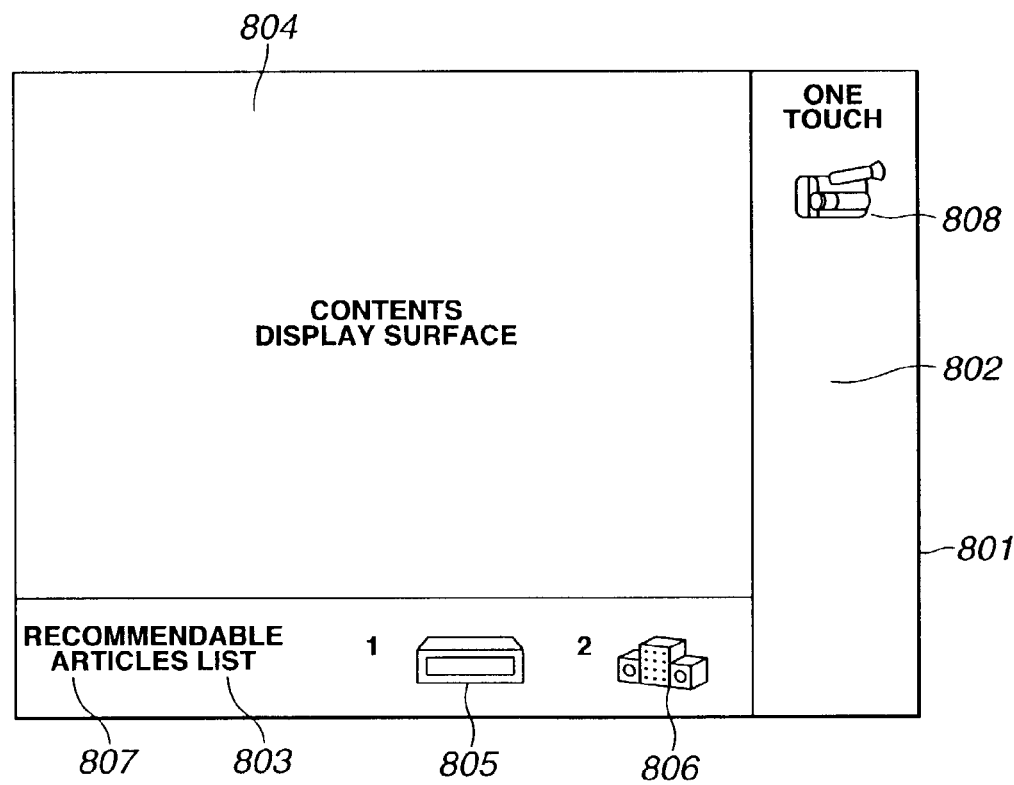
FIG. 8 is a view showing an example of user interface suitable for digital television, etc. in utilization of information picture.

In the case where information picture is utilized with respect to portable terminal such as digital television or PDA (Personal Data Assistance), etc., it is suitable to adopt look and feel as shown in FIG. 8. Accordingly, this will be explained.

Display screen 801 acts so that human being can visually grasp information from display unit, e.g., Braun tube display surface, TFT liquid crystal screen and screen in display unit assembled in glasses attached to human body, etc. While the boundary portion of the display screen 801 is outermost frame of the display device in this figure also in this example, there may be employed an implementation such that this frame is displayed within display device.

One touch frame 802 functions similarly to the above-mentioned one touch window, and is frame for displaying at least picture image 808. When an operator of terminal of this information display unit designates picture image 808 by operation means (not shown), the one touch frame 802 displays at least one related information to start any processing based on that information, and in the case where there are plural related information, the one touch frame 802 selects any one of them to have ability to start any processing based on that information. Namely, this one touch frame 802 acts as special management area for guiding specific operation with picture image 808 being as clue on the display screen 801, and the operator of terminal can realize new operation with picture image displayed within this area being as clue.

Information providing frame 803 functions similarly to the above-mentioned information providing window, and is frame for displaying at least picture images 805, 806, etc. When the operator of terminal of this information display unit specifies picture image displayed within this frame by operation means (not shown), new picture is supplemented to the one touch frame 802 on the basis of this operation.

It is to be noted that, as picture image supplemented at this time, picture image specified and displayed within the information providing frame 803 may be displayed as it is, and switching into other picture image may be employed as occasion demands. Within the information providing frame 803, character information 807, etc. may be displayed in addition to picture image.

Namely, this information providing frame 803 acts as special management area (first management area) for displaying picture image, etc. on display screen 801 to allow the operator of terminal to be interested and for allowing the operator of terminal to carry out operation to specify picture image to conduct registration with respect to the one touch frame 802.

It is to be noted that when pointing device such as mouse, etc. is provided at operation means with respect to specific operation by the operator of display/operation terminal and registration with respect to one touch frame 802, there may be used user interface technique which is so called drag and drop to designate picture image desired to be registered by pointer to move such picture image onto one touch frame 802 to drop it.

Contents display surface 804 is frame for displaying contents, e.g., movie, etc. in digital broadcast, and is area utilized for displaying information that the operator of terminal desires to obtain. It is to be noted that such contents include all information which stimulate visual sense of human being to carry out transmission, e.g., information of still picture, or character broadcast, etc. without limiting moving picture, etc.

(1.5. Example of System Configuration Common to Embodiment of this Application)

Initially, the system configuration of an information picture utilization system according to this invention will be described with reference to FIG. 1. As shown, this information picture utilization system 100 employs the configuration in which an information picture generating server 112 that information provider mainly operates, an information picture providing server 114 opened so that reference can be made in the first management area of client connected to a network 130, an information picture management server 116, and clients 120 (120-1, 120-2 to 122-n) in which information picture processing unit according to this embodiment is assembled so that a first management area 122 and a second management area 124 can be displayed are connected by the unidirectional communicatable network 130 such as internet, etc.

The network 130 acts as irrespective of wire or wireless so that when devices connected to the network respectively establish session with respect to target devices, transmission/reception of information can be carried out therebetween For this reason, in FIG. 1, indication such that network is connected by single main line is made. However, such network may be realized in such a manner that plural networks are combined through gate-way as in the case of internet. Moreover, also with respect to the connection, even if network is not directly connected to the main line which is so called backbone and is temporarily connected by PPP connection, etc., it is sufficient that transmission/reception of information can be made between devices when session is established. Information which is caused to undergo transmission/reception through network 130 is mainly information picture, various information guided through information picture, processing information for permitting information picture to be utilized at the client side, time limit information accompanying with information picture, and information appearing on the basis of operation of information picture at client.

The information picture generating server 112 is an information processing apparatus such as computer, etc., and is an apparatus for synthesizing picture information and related information for allowing the operator to cause a predetermined operation on the basis of the picture information to collect the synthesized information as one handling unit. In this case, with respect to time limit information, according to an embodiment, such time limit information is included or inserted into information picture by information picture provider in preparing information picture at this information picture generating server 112.

An information picture providing server 114 is also an information processing apparatus such as computer, etc., and is constituted as, e.g., information picture open server constituted so that registered information picture can be read. The information picture providing server 114 serves to provide information picture or other information with respect to client 120 which has provided access to this information picture providing server 113 through network 130. Moreover, in accordance with an embodiment, in the case where the client 120 has not information picture support program as the information picture processing apparatus necessary for allowing the client 120 to display and operate information picture, the information picture providing server 114 also functions as providing server of the information picture processing apparatus. Further, in accordance with an embodiment, there may be employed a configuration such that time limit information is included in information picture when information picture is transmitted from this information picture providing server 114 to the client 120.

The information picture management server 116 is a server apparatus such as computer, etc. connected to terminal through network, and has a function to carry out management of information relating to user of the information picture processing apparatus, and/or operation information of information pictures at respective clients, etc. Moreover, in an embodiment, the information picture management server 116 has a function to provide an information picture processing apparatus in accordance with request from client, and to carry out management of information relating to user transmitted from client as compensation of providing of the information picture processing apparatus. Further, in an embodiment, the information picture management server 116 has a function to carry out management of user information or operation information of information picture to carry out a predetermined charging processing.

It is to be noted that while the information picture generating server 112, the picture information providing server 114 and the information picture management server 116 are respectively constituted as separate hardwares in the example illustrated, the system may be constituted as common hardware by arbitrary combination.

The clients 120 (120-1 to 120-n) are so-called information terminal equipments, and have a function such that at least information picture processing means is incorporated to have ability to display and operate information picture. In more practical sense, e.g., personal computer, portable information terminal and/or home electric equipment having information terminal function, etc. are included in the client.

The network 130 is constituted so as to permit information data formatted in accordance with a predetermined protocol to bidirectionally circulate, as represented by internet. It is to be noted that the network 130 is internet constituted to be open with respect to public, the system may be constituted as closed environment such as LAN or WAN, etc.

(1.6. Utilization Relationship of Information Picture between Server and Client)

Figure 2:
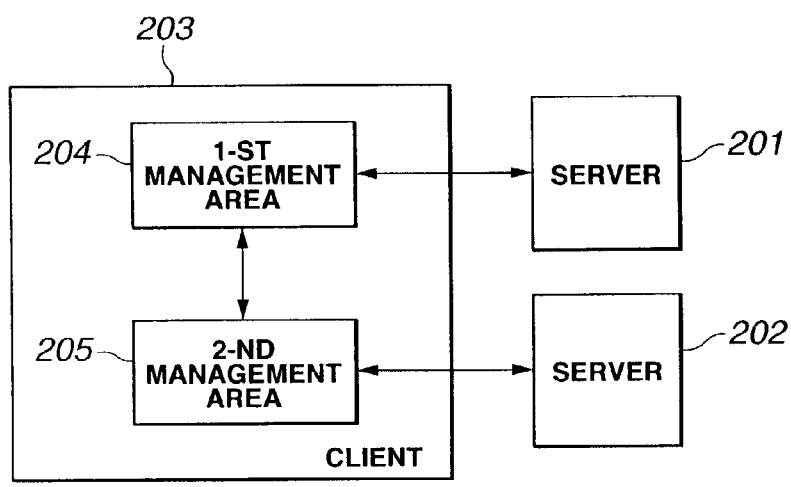
FIG. 2 is a view showing the relationship between server and management area within client, which is common to respective embodiments of this invention.

The relationship between server functioning as infrastructure for utilizing information picture (information open server management server) and client (information terminal equipment) in the information picture utilization system according to this embodiment will now be described with reference to FIG. 2.

A server 201 is an apparatus such as computer, etc. for providing corresponding picture information in response to information picture acquisition request of client 203 functioning as information display unit. The server 201 is site where, e.g., registered information picture can be read, and serves to offer this information picture or other information to terminal in which access to this site is made through network and corresponds to the information picture providing server 114 in the information picture utilization system 100 shown in FIG. 1.

A client 203 is information display apparatus, information terminal apparatus or apparatus merely called terminal connected through network to the server 201, and has a function such that at least information picture processing means which will be described later is incorporated to have ability to display and operate information picture. In more practical sense, e.g., the client 203 is adapted so as to have ability to carry out operations of a first management area 204 and a second management area 205 having functions different from each other therewithin. In this case, the client 203 corresponds to the clients (120-1 to 120-n) in the information picture utilization system 100 shown in FIG. 1. The first management area 204 is adapted to display picture image acquired from the server 201, and corresponds to information providing windows 502, 605 and information providing frame 803 in terms of graphic image which will be described later.

The second management area 205 is adapted so that information picture processing apparatus which will be described later is incorporated, whereby it is displayed. When specific picture image is designated in the first management area 204, its content is registered and its content is displayed. When the operator of terminal specifies picture image displayed here by operation means (not shown), at least one related information is displayed on the basis of this operation to start any processing based on that information. In the case where there exist plural related information, control for selecting any one of them to start any processing based on that information is carried out. When speaking in terms of graphic image which will be described later, the second management area 205 corresponds to one touch windows 504, 705 and one touch frame 802.

A server 202 is information processing apparatus such as computer connected to the client 203 through network to provide information picture processing apparatus under control of the second management area 205 or to register user information offered from the client 203 to carry out management, and to further carry out charging processing. Accordingly, the server 202 corresponds to information picture management server 116 in the information picture utilization system 100 shown in FIG. 1.

It is to be noted that while the server 201 and the server 202 are described as servers different from each other in this example, it is needless to say that they may be constituted as the same server in dependency upon property of information supplied or construction specification of server.

In this example, with respect to the second management area 205 and the first management area 204 in the client 203, they are respectively controlled by program. Namely, related information included in information picture relating to picture information displayed in the second management area 205 is interpreted by program constituting picture information processing apparatus which controls the second management area 205 so as to have ability to execute operation caused to correspond to related information that the operator has designated.

As described below, between the first management area 204 and the second management area 205, communication of related information, etc. is carried out. In general, with respect to communication between processes/between sleds, it is possible to select various techniques as its realization technique. For example, control unit for controlling two areas can carry out communication by making use of shared memory space. In addition, such an approach may be employed to prepare new and different process to carry out communication with respect to this process to thereby carry out data communication between the first management area 204 and the second management area 205.

(1.7. Communication between the First Management Area and the Second Management Area)

Between the first management area and the second management area, communication of related information, etc. is carried out. This is realized by communication between processes or between sleds. In general, with respect to communication between processes/between sleds, as the realization technique, various techniques can be selected. For example, control unit which controls two areas can carry out communication by making use of shared memory space/file. In addition, when Windows by Microsoft Company is used as OS of computer of client, such an approach may be employed to prepare new and different process to establish communication on the basis of COM (Common Object Model) technology between corresponding process and this process, thereby also making it possible to carry out data communication between the first management area and the second management area. Since it is possible to carry out various selections by OS implemented in client computer with respect to this communication mechanism, it is sufficient to employ suitable communication means as occasion demands.

(2. With Respect to Embodiment for Limiting Communication at the Client Side)

Explanation will now be given in more practical sense in connection with preferred system, etc. of this invention.

Here, explanation will be first given in connection with the case where the client side mainly limits communication. The way of this limitation can be classified into the case where communication is limited on the basis of limit information added to information picture and the case where communication is limited on the basis of history from the time when information picture is registered at the client. These cases will be described in order. It is to be noted that it is a matter of course that these cases can be independently carried out, and it is also permitted to implement these cases in combination at the same time.

(2.1. Case where Communication is Limited on the Basis of Limit Information Added to Information Picture)

In the case where limit information is added to information picture, client computer interprets this added limit information. In the case where information is above its limitation, the client computer does not carry out communication with server, or carries out limiting operation to only communicate with a specific opposite communication side, etc. This will be described in detail below.

(2.1.1. Configuration of Information Picture)

In this embodiment, lifetime information relating to corresponding information picture is included in information picture. In more practical sense, there are provided information pictures as shown in FIGS. 9 and 10.

Figure 9:
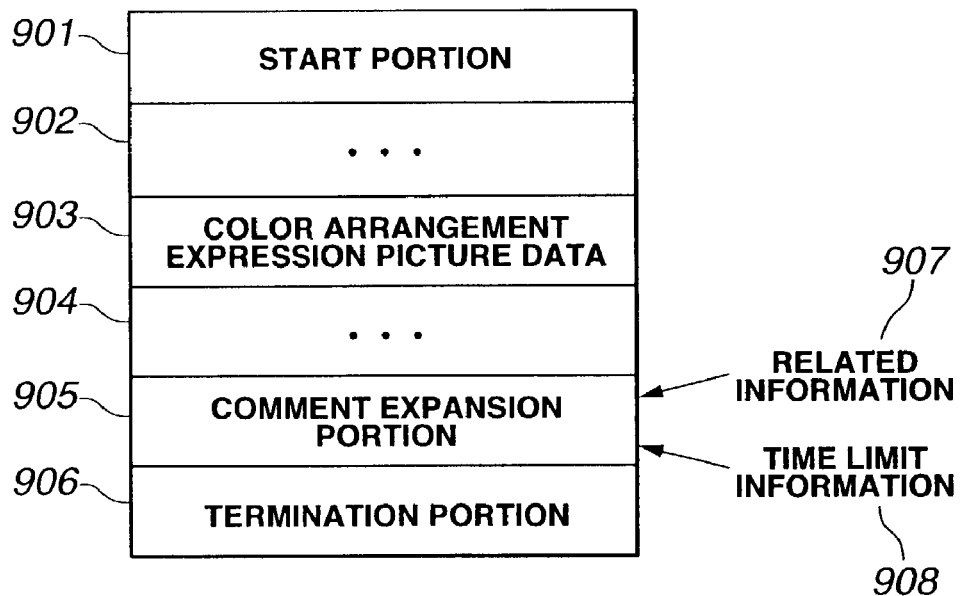
FIG. 9 is a view showing an example where time limit information is inserted into information picture in the first embodiment.

FIG. 9 shows information picture using information body of the GIF form similarly to the information picture which has been explained in the item of the common concept, but time limit information which differs from the above-mentioned information picture will be described here.

In this example, time limit information 908 is information for prescribing valid time limit (effective time period) of this information picture as described later, and can allow operation of information picture to be disabled after time period is passed, allow information to management server of operation log of information picture to be invalid, or make prescribing operation so that a certain predetermined operation is first enabled after time period is passed. Among them, particularly in the case of allowing operation of information picture to be disabled after time period is passed, or allowing information to management server of operation log of information picture to be invalid, the time limit information functions as lifetime information. Similarly to the related information 907, this time limit information 908 is also arranged as it is or after processing such as ciphering, etc. is implemented within the comment expansion portion 905 so that it is collected as one picture information. Thus, as the result of this, picture information as data stream can include related information or identifier therewithin.

Figure 10:
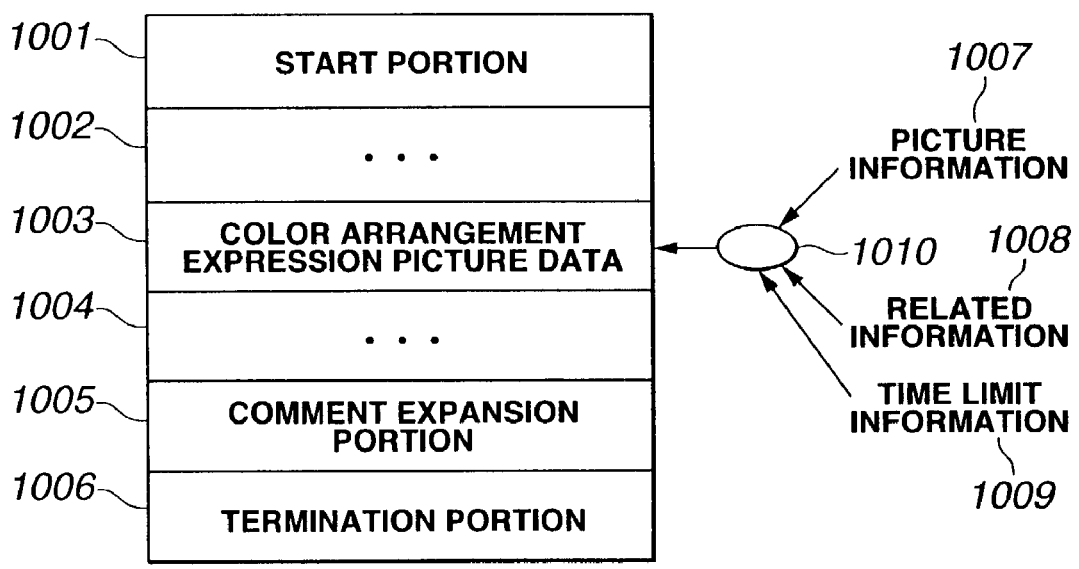
FIG. 10 is a view showing an insertion example into other information picture in which time limit information is inserted.

On the other hand, FIG. 10 is information picture using information body of the GIF form in the same manner as stated above, wherein related information is included in the form superimposed oil picture information.

Also in this case, time limit information 1009 is information for prescribing valid time period of this information picture, and can allow operation of information picture to be disabled after time period is passed, allow information to management server of operation log of information picture to be invalid, or make prescribing operation so that a predetermined operation is first enabled after time period is passed.

(2.1.2. Configuration and Operation of Client)

Figure 11:
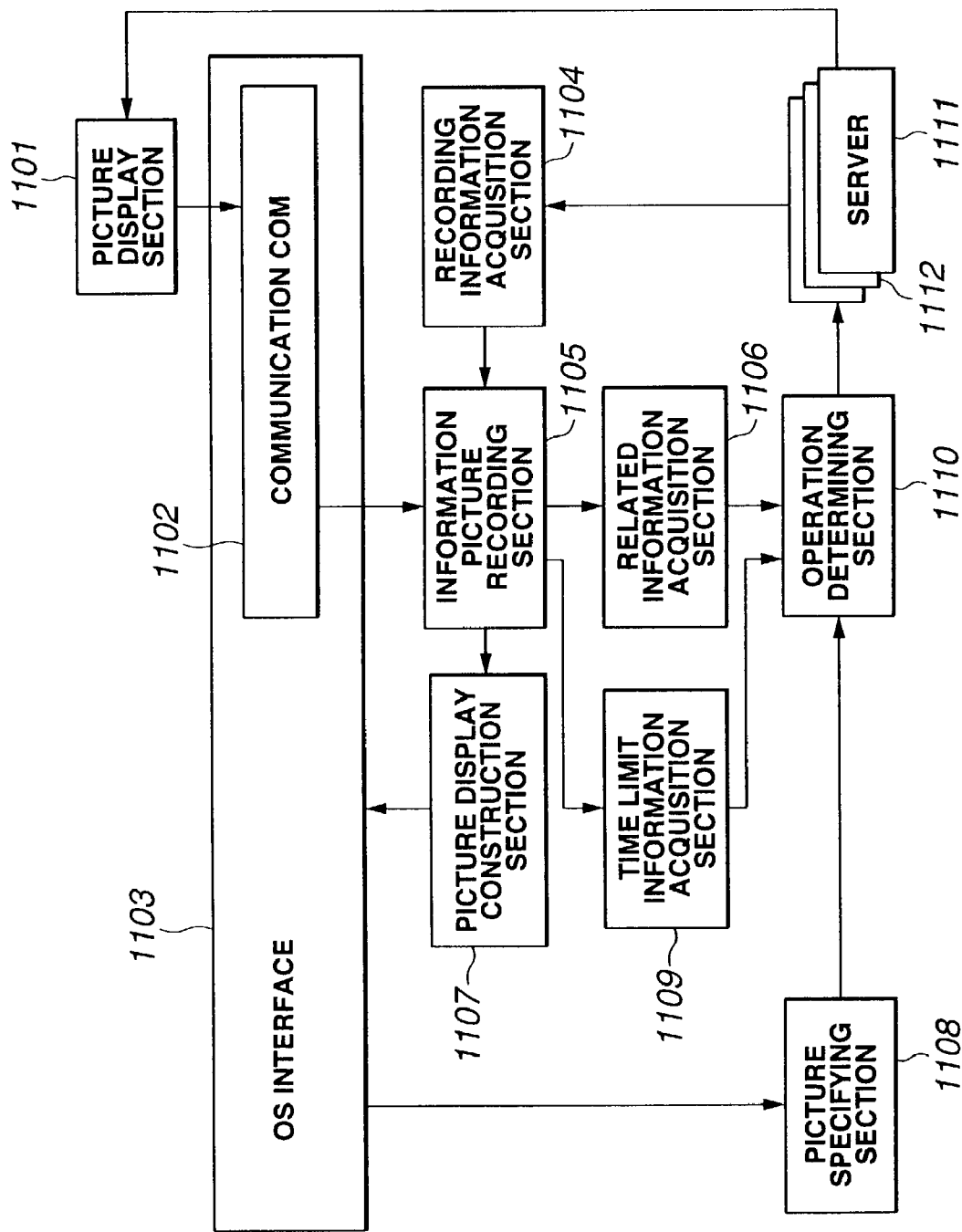
FIG. 11 is a view showing an example of the configuration of client computer when other information picture in which time limit information is included is used.

The configuration and the operation of client according to this embodiment will now be described with reference to FIG. 11. A picture display section 1101 is, e.g., internet explorer by Microsoft company, and is adapted so that when down load instruction of information of specific server is given from an operator, logical connection is made to servers 1111 and 1112 through network on the basis of that instruction to acquire that information to display it within the first management area.

Moreover, the second management area can be implemented by constituting, e.g., a recording information acquisition section 1104, an information picture recording section 1105, a related information acquisition section 1106, a picture display construction section 1107, picture specifying section 1108, a time limit information acquisition section 1109, and an operation determining section 1110, etc.

A communication COM 1102 is communication realization means between processes (or between sleds, which will be referred to below in the same manner) utilizing Component Object Model which is function of OS, and is adapted so that in the case where user interface operation, e.g., drag and drop is carried out, transmission of information from dragged process to dropped process is realized.

The recording information acquisition section 1104 is connected to network, and is adapted to receive information picture from server 1111 (or 1112) to transfer such information picture to the information picture recording section 1105 of the succeeding stage.

The information picture recording section 1105 is adapted to record information picture notified from the communication COM 1102 or the recording information acquisition section 1104 and such that picture information and related information are collected as one handling unit. In this case, in place of recording such information as information picture, such an approach may be employed to respectively record picture information and related information into different memories in the state where they are caused to have relevancy. The information picture recording section 1105 is adapted so that when registration operation of information picture is made by drag and drop operation from the first management area to the second management area, etc., it makes, to specific server through the related information acquisition section 1106, notification to the effect that information picture is registered into the second management area.

The related information acquisition section 1106 is connected to the information picture recording section 1105, and is adapted to acquire only the portion of related information from information picture recorded in the information picture recording section 1105. Moreover, the time limit information acquisition section 1109 is connected to the information picture recording section 1105, and is adapted to acquire only the portion of time limit information from information picture recorded in the information picture recording section 1105.

The picture display construction section 1107 is connected to the information picture recording section 1105, and displays all information pictures recorded in the information picture recording section 1105, or selects any one of information pictures to display selected one. Namely, the picture display construction section 1107 permits the operator to perceive picture image according to information picture through the one touch frame (one touch window).

The picture specifying section 1108 is adapted so that in the case where the operator specifies picture image displayed in the second management area by function of OS interface 1103, information picture corresponding to that picture image is specified.

The operation determining section 1110 is connected to the picture specifying section 1108, the related information acquisition section 1106 and the time limit information acquisition section 1109, and executes operation on the basis of related information of information picture specified by the operator. For example, in the case where it is judged that corresponding information picture has passed time limit by time limit information acquired at the time limit information acquisition section 1109, a predetermined operation written in the time limit information is carried out as described later.

The operation of the client constituted as described above will now be described. Initially, the operator of the client acquires a desired information picture from a predetermined information open server (information picture providing server) 1111 to allow the picture display section 1101 to display that information picture. At this time, in the case where internet explorer is used at the picture display section 1101, there is carried out operation to display WEB page of auction site by http protocol.

Further, when the operator of the client looks at picture image displayed to thereby specify information picture that he desires to acquire information, there is carried out operation to shift this information picture to the second management area by interface operation such as drag and drop, etc. At this time, since picture caused to undergo drag and drop is information picture, that picture image is recorded into the information picture recording section 1105 through the communication COM 1102. At this time, in addition, by action of the related information acquisition section 1106 and the time limit information acquisition section 1109, notification to the effect that corresponding information picture is registered into the second management area is made to the information picture open server 1111 and/or the management server 1112 through the operation determining section 1110.

Here, in the case where the time limit information acquisition section 1109 judges that valid time period of information picture that the operator of the client designates has been passed, this section 1109 notifies it to the operation determining section 1110. In the case where the valid time period has been passed, the operation determining section 1110 does not notify operation log of information picture to the information picture open server 1111 and/or the management server 1112. Moreover, the operation determining section 1110 may inhibit operation of information picture itself. While the above-described example is directed to the case where terminating time of valid time period is described, there may be also employed configuration such that initial time of valid time period is described in a manner opposite to the above. In such a case, it is of course also possible to employ, e.g., configuration so as to first permit a specific operation of information picture after valid time period judged by the time limit information acquisition section 1109.

On the other hand, information picture recorded in the information picture recording section 1105 according to the second management area is displayed with respect to the operator of client through the OS interface 1103 by action of the picture display construction section 1107. Further, when the operator of tender client carries out operation on the basis of related information recorded in the displayed information picture, operation relating to its related information is carried out by action of the picture specifying section 1108 and the operation determining section 1110.

(2.1.3. Example of Description of Time Limit Information by Information Picture Generating Server)

Figure 12:
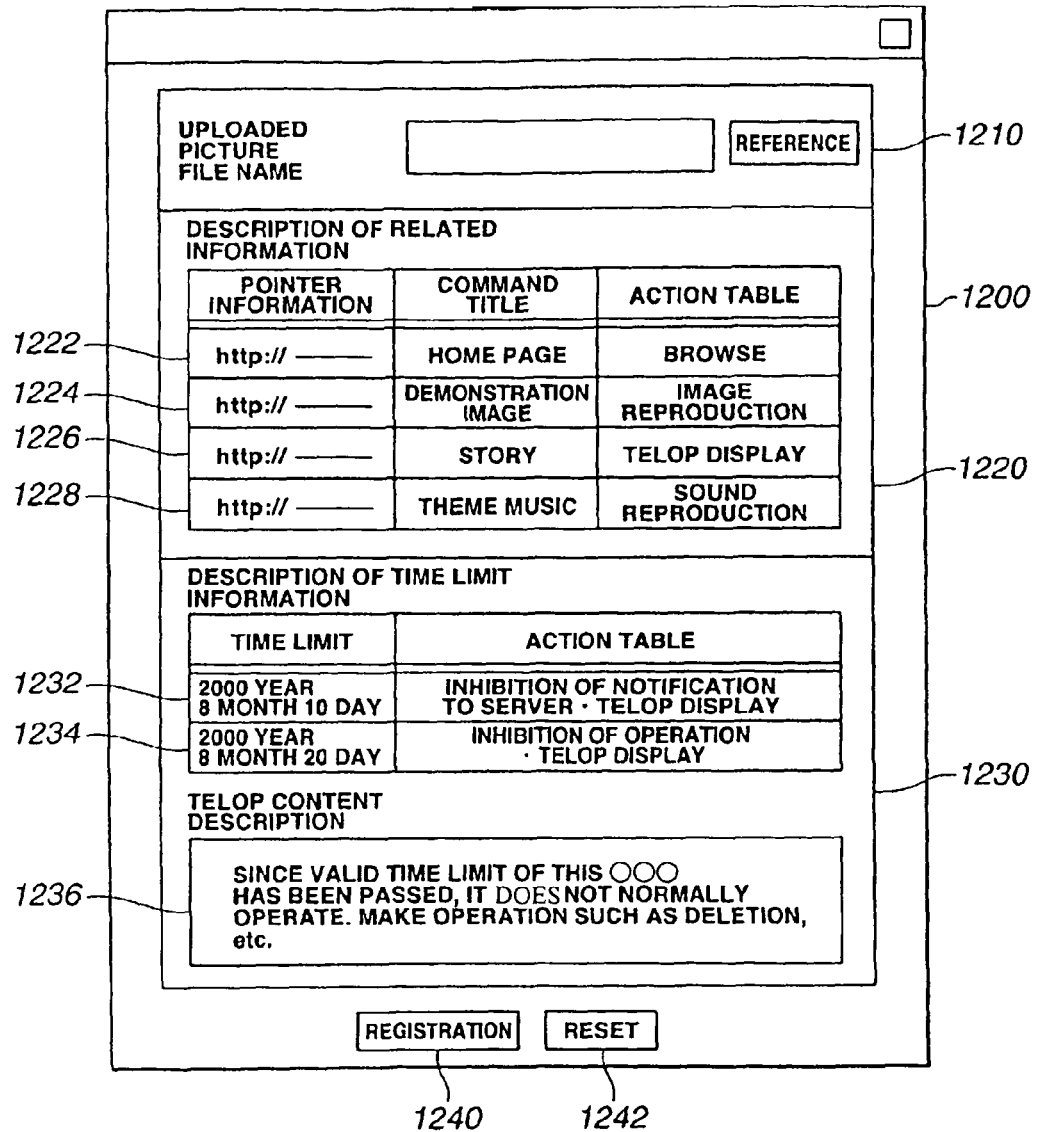
FIG. 12 is a view showing an example of user interface which carries out time limit information write instruction in information picture generating server when other information picture in which time limit information is inserted is used.

An example of user interface for recording time limit information in the information picture generating server is indicated with reference to FIG. 12. This is an example for easily permitting preparation of information picture on screen 1200 of Windows, etc. Information picture is picture in which picture information and related information are essentially synthesized. A person who makes information picture designates picture information in picture file designation frame 1210 and describes related information in related information describing frame 1220.

In the related information describing frame 1220, operations sequentially carried out in the case where the operator operates information picture in client are described. The example illustrated is advertisement picture of a certain game software, wherein description of related information is carried out in such a manner that browser display of home page is first carried out (1222), demonstration image is subsequently reproduced (1224), telop display of story is subsequently carried out, and theme music is reproduced (1228).

Further, in accordance with this embodiment, it is possible to carry out description relating to time limit information in time limit information describing frame 1230. In the example illustrated, the time period (time limit) is set in a manner of two steps. Initially, in the first time period, setting is made such that operation log of information picture is not notified to management server (1232). In the second time period, operation of information picture itself is inhibited (1234). Here, time limit information described can be variously set. While the description relating to terminating time of valid time period is carried out in the example illustrated, it is needless to say that description relating to initial time of valid time period is carried out here in a manner opposite to the above. In addition, in the case where telop is desired to be displayed in connection with information in which time limit has passed, it is possible to describe telop character desired to be displayed on picture of client in telop display frame 1236.

In the case where preparation of information pciture that person who makes information picture intends is completed in the respective frames which have been described above, he presses a registration button 1240, whereby picture information, related information and time limit information are synthesized so that information picture is generated. The information picture thus generated is registered at a predetermined portion of information picture open server (not shown) as occasion demands. On the contrary, in the case where there is a need to carry out modification, etc., a reset button 1242 is pushed down so that the content described on picture 1200 on screen is reset.

It is to be noted that while addition of time limit information with respect to information picture is carried out at the information picture generating server in the example shown in FIG. 12, this invention is not limited to such example. For example, it is needless to say to employ a configuration adapted for adding time limit information in sending information picture to client in the information picture open server (information picture providing server).

(2.1.4. Example of Operation of Time Limit Information)

An example of operation of time limit information in client will now be described with reference to FIGS. 13 and 14.

Figure 13:
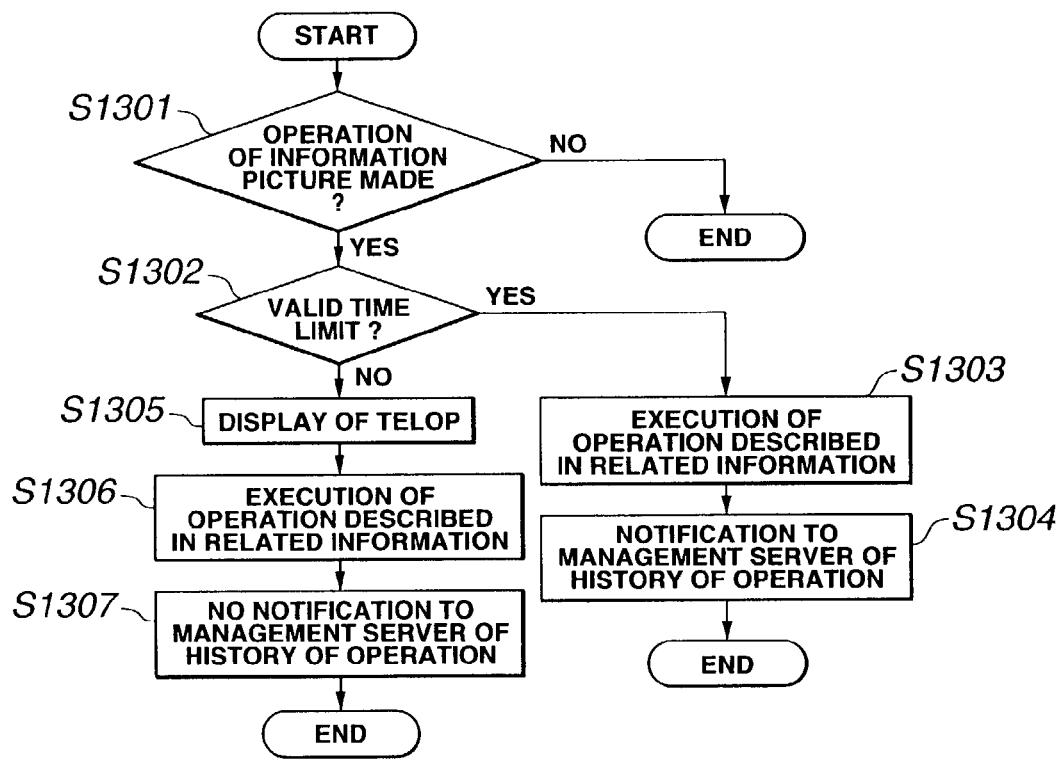
FIG. 13 is a flowchart showing time limit information management procedure when other information picture in which limit information is inserted is used.

Initially, the example shown in FIG. 13 is directed to the configuration adapted for inhibiting notification of operation log from client to management server on the basis of time limit information to relax traffic with respect to management server. First, information picture processing apparatus of client judges whether or not operation of information picture is carried out in client (S1301). In the case where operation of information picture is carried out, time limit information is confirmed (S1302). If the operated information picture is within valid time period as the result of confirmation of time limit information, a predetermined operation described in the related information is carried out (S1303). Thus, operation log is notified to the management server (S1304). On the contrary, in the case where the operated information picture has passed the valid time period, telop for calling attention of the operator is displayed on the screen of client (S1305). Thereafter, a predetermined operation described in the related information is carried out (S1306). It is to be noted that since operated information picture is picture in which valid time period has been passed, operation log is not notified to the management server (S1307).

Figure 14:
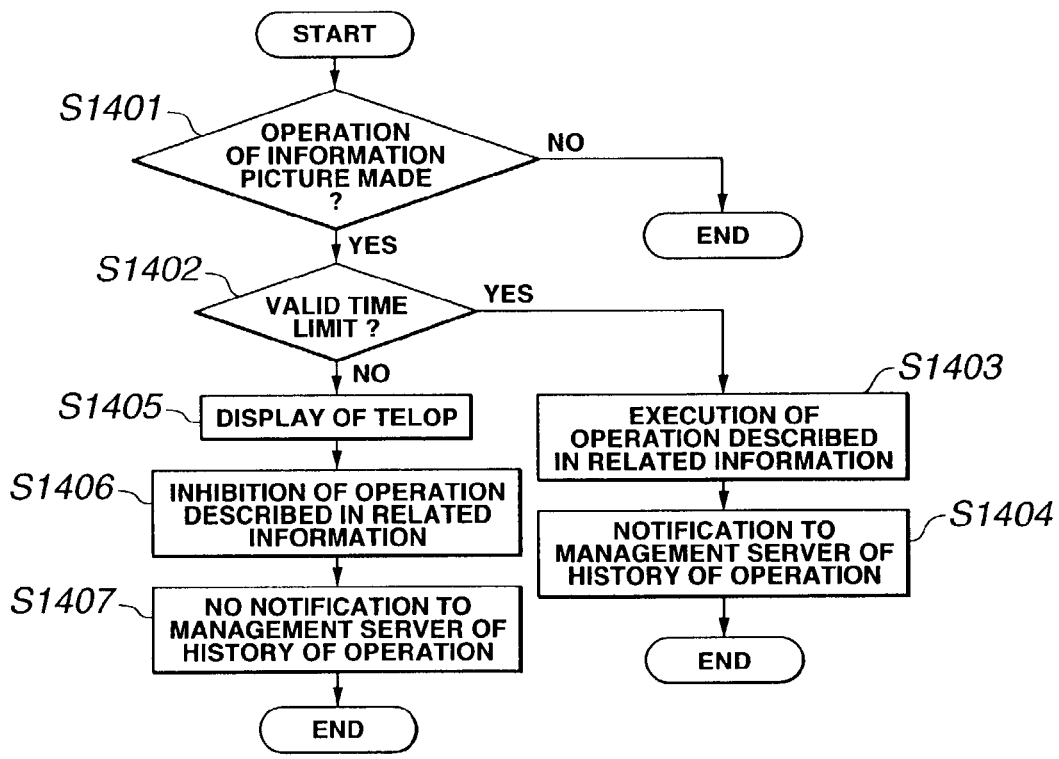
FIG. 14 is a flowchart showing another time limit information management procedure when other information picture in which time limit information is inserted is used.

Further, the example shown in FIG. 14 is directed to the configuration for not only inhibiting notification of operation log from client to management server on the basis of time limit information, but also inhibiting operation itself of information picture in client. Initially, the information picture processing apparatus of client judges whether or not operation of information picture is carried out in client (S1401). In the case where operation of information picture is carried out, time limit information is confirmed (S1402). If the operated information picture is picture within the valid time period as the result of confirmation of time limit information, a predetermined operation described in related information is carried out (S1403). Thus, operation log is notified to management server (S1404). On the contrary, in the case where the operated information picture is picture which has passed valid time period, telop for calling attention of the operator is displayed on the screen of client (S1405). Further, the predetermined operation described in the related information is inhibited (S1406). In addition, since the operated information picture is picture in which valid time period has been passed, operation log is not notified to management server (S1407).

(2.1.5. Example of Charging System Using Time Limit Information)

When the time limit information according to this embodiment is used as described above, the charging system can be optimized. The case where charging is implemented to information provider who intends to register information picture into information picture open server to guide user to desired information is taken as an example. In the case where the charging system is set to quantity dependent system corresponding to the number of clicks with respect to information picture of client, charging would be implemented to information provider also in the case where information picture becomes old so that it does not effectively act on marketing. However, since if time limit information according to this embodiment is used, it becomes possible to exclude charging based on information picture in which valid time period has been passed so that information picture becomes old, information provider can accept charging without stress.

Further, if time limit information is utilized, it is possible to construct system for carrying out charging with respect to operation of information picture limited to specific time period. For example, it is possible to construct charging system particularly effective in the case of developing term limited goods, such as, for example, midyear gift or year-end gift, etc. of department store. In addition to the above, it is possible to assume various charging processing in accordance with business model. As long as there is employed configuration for carrying out charging processing by making use of time limit information, even if any business model is employed, it is understood that such business model belongs to the technical range of this invention.

(2.2. Case where Communication is Limited on the Basis of History from the Time when Information Picture is Registered into Client)

Subsequently, explanation will be given in connection with the case where communication is limited on the basis of history taking place after registration of information picture at the client side.

This embodiment is characterized in that updating history recording section is added to the configuration for controlling second management area of client to have ability to grasp updating history with respect to respective recorded information pictures, and there is provided operation permission/negation section for determining permission/negation of operation based on related information on the basis of the history information.

Figure 15:
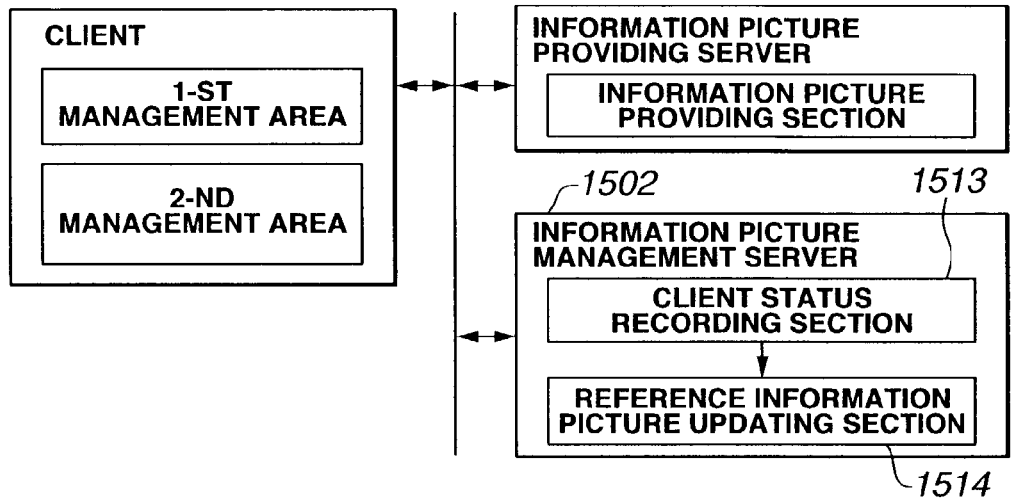
FIG. 15 is a view showing an example of system configuration when communication is limited on the basis of history from the time when information picture is registered at client.
Figures 23, 24, 25:
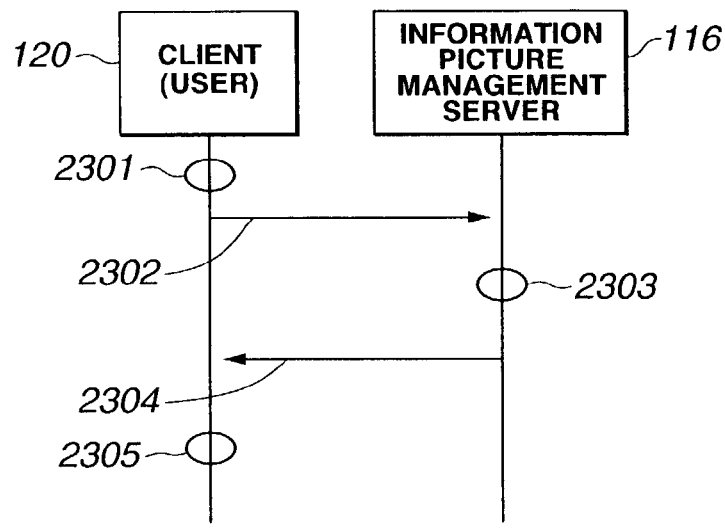
FIG. 23 is a flowchart when communications traffic control is carried out on the basis of information recorded in information picture management server.
FIG. 24 is a view showing an example of client interface when communications traffic control is carried out on the basis of information recorded in information picture management server, wherein setting can be made from browser.
FIG. 25 is view showing a recording example of information recording at registered information picture specific information recording means.

In this embodiment, the configuration of the system is substantially the same as the case of the above-mentioned embodiment (2.1.), but the detail of the information picture management server will be described for the purpose of some supplement with reference to FIGS. 15 and 25.

(2.2.1. Configuration of Information Picture Management Server)

An information picture management server 1502 is connected to network, and includes a registration client status recording section 1513 and a reference information picture updating section 1514 therewithin.

Here, the configuration of the client status recording section 1513 will be described with reference to FIG. 25.

The client status recording section 1513 carries out communication between this server and client directly or indirectly connected to this server so that it can communicate with this server. The reason why the client is directly or indirectly connected is that it is sufficient that there results mutually communicatable circumstances even in the case where client is directly connected to network irrespective of wire/wireless, client is connected through buffer, etc. or gate-way, etc. intervenes as network. Namely, when information picture which has been present in the first management area of at least client is registered into the second management area, notification from the second management area is made. At this time, the client status recording section 1513 establishes, on the basis of this notification, ID which can individually identify at least client (hereinafter referred to as client ID) 2501 and registered information picture specifying information (i.e., information picture ID) 2502 which specifies registered information picture (e.g., file name of information picture, etc.) to record such information as one record. For this reason, the client status recording section 1513 functioning as data base is adapted so that when inquiry is carried out by using ID of client, it is possible to grasp what information picture that client registers into the second management area. Further, when inquiry is carried out by using information picture specifying information, it is possible to grasp what client registers that information picture into the second management area. It is to be noted that, in this embodiment, among them, it is sufficient to carry out inquiry using information picture specifying information. In addition, when registration date 2503 indicating date when this registration is carried out, and other information 2504 are recorded together at the same record, such an approach is advantageous in taking various statistics, etc.

The reference information picture updating section 1514 will now be described. The reference information picture updating section 1514 is adapted to have ability to update a specific information picture that a specific client has into another information picture. For this reason, when client that the client status recording section 1513 records establishes session with respect to this information picture management server 1502, ID of client in which this session is held, and client corresponding to that client inquires information picture recorded in the second management area with respect to the client status recording section 1513 to thereby detect such information picture. When picture to be updated is included within these information pictures, updated information picture is sent by using socket of the session. In this case, preparation of session in the case where Windows is used as OS is described in detail particularly in http://www.asia.microsoft.com/japan/developer/library/vcsample/_sample_mfc_chatsrvr.htm and http://www.asia.microsoft.com/japan/developer/library/vcsample/_sample_mfc_chatter.htm in MSDN of Microsoft Company.

It is to be noted that although described in detail in the description in this embodiment, when campaign/event in which it is suitable to use this embodiment is carried out, it is advantageous that event sponsor applies updating particularly one information picture of plural information pictures to be particularly collected with respect to the operator of client. For this reason, here, such section is not caused to be called merely information picture updating section, but is called to be "reference" information picture updating section.

(2.2.2. Configuration of Client)

Here, explanation will be given with reference to FIG. 16 in connection with the configuration of the client computer.

In the client computer, as explained in the item of the common concept, programs for controlling respective first and second management areas are operated. In this embodiment, among them, there are included characterizing portions (updating history recording section, operation permission/negation portions) in the second management area.

A picture display section 1601 is, e.g., internet explorer by Microsoft Company or netscape navigator by Netscape company, and is operative so that when down load instruction of information of specific server is given by an operator, logical connection is made through network with respect to information picture providing server 210 on the basis of that instruction to acquire that information to display it in the first management area.

Further, the second management area may be carried out by constituting, e.g., an updating iso-information picture acquisition section 1604, an information picture recording section 1605, a related information acquisition section 1606, a picture display construction section 1607, a picture specifying section 1608, an operation determining section 1609, an updating history recording section 1612, and an operation permission/negation section 1613.

A communication COM 1602 is communication realization means between processes (or between sleds, which will be the same hereinafter) utilizing Component Object Model which is function of OS, and is adapted so that in the case where user interface operation, e.g., drag and drop, etc. is carried out, transmission of information from dragged process to dropped process is realized.

The updating iso-information picture acquisition section 1604 is connected to network, and is adapted to receive information picture from an information picture management server 1611 to transfer it to the information picture recording section 1605 of the succeeding stage.

Here, with respect to reception of information picture, there are two techniques.

In the first technique, there is employed an approach to inquire of the information picture management server 1611 by polling as to whether or not information is updated with respect to information picture recorded in the information picture recording section 1605 which will be described below, whereby in the case where updating is carried out, that information is acquired.

In the second technique, there is employed an approach to send information picture to client of information picture which is caused to undergo management within information picture management server on the basis of information recorded in the client status recording section constituting the information picture management server 1611 to receive such information picture.

In this invention, among these techniques, particularly in the case where the first technique is employed, lowering of communications traffic according to updating operation of information picture remarkably takes place.

The information picture recording section 1605 is adapted to record information picture notified from the communication COM 1602 or the updating iso-information picture acquisition section 1604 and such that picture information and related information are collected as one handling unit. It is to be noted, in this case, in place of carrying out recording as information picture, there may be employed an approach to respectively record picture information and related information into different memories in the state where they are caused to have relevancy, etc. The information picture recording section 1605 is also adapted so that when registration operation of information picture is carried out by drag and drop operation from the first management area to the second management area, etc., it carries out a notification to the effect that information picture is registered into the second management area to a specific server through the related information acquisition section 1606.

The related information acquisition section 1606 is connected to the information picture recording section 1605, and is adapted to acquire only the portion of related information from information picture recorded in the information picture recording section 1605.

The picture display construction section 1607 is connected to the information picture recording section 1605, and is adapted to display all information pictures recorded in the information picture recording section 1605 or to select any one of them to display selected one. Namely, the operator is permitted to perceive picture image according to information picture through the one touch frame (one touch window).

The picture specifying section 1608 is adapted so that in the case where the operator specifies picture image displayed in the second management area by the function of OS interface 1603, information picture corresponding to that picture image is specified.

The operation determining section 1609 is connected to the picture specifying section 1608 and the related information acquisition section 1606, and is adapted to execute operation on the basis of related information of information picture specified by the operator.

In this example, information picture providing server 1610 and information picture management server 1611 are respectively the same as information picture providing server 114 and information picture management server 116.

The updating history recording section 1612 is connected to the information picture recording section 1605, and is adapted so that when information picture recorded in the information picture recording section 1605 is updated, or when information picture is newly recorded, it receives notification to the effect that updating/recording has been carried out to record information for specifying this information picture together with time information indicating that corresponding updating/recording has been carried out.

Additionally, at time information, it is sufficient that preceding and proceeding timings of updating/recording can be graspsed. For this reason, it is enough to record time information as list in the ring buffer form.

Figure 17:
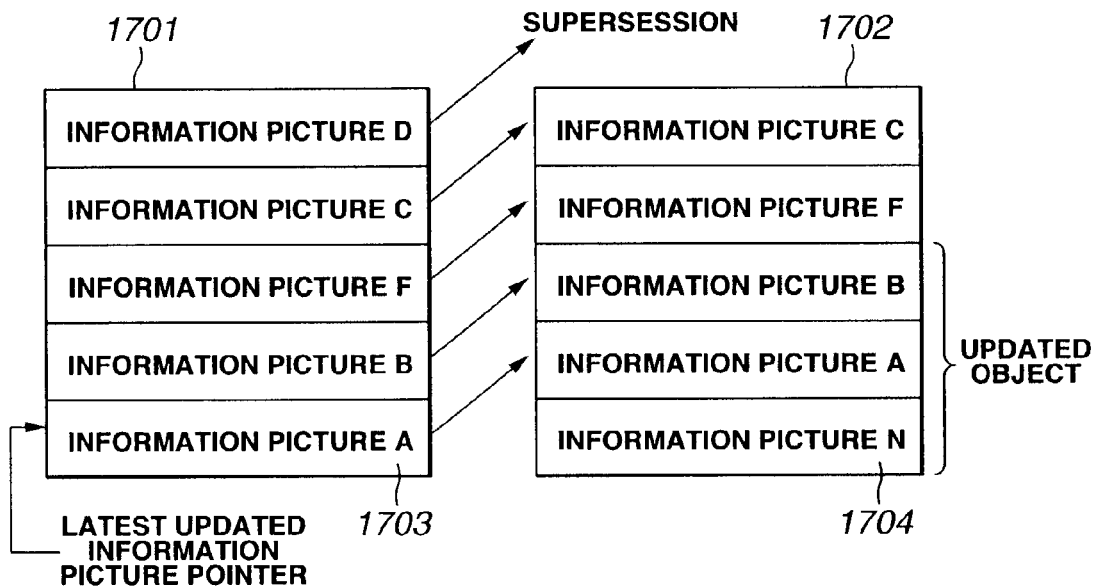
FIG. 17 is a view showing an example of history management when communication is limited on the basis of history from the time when information picture is registered at client.

In more practical sense, when list structure as shown in FIG. 17 is employed, structure is simple. FIG. 17 is a view showing change state of list when information picture N is newly updated/recorded.

In an updating history recording portion 1701, there are recorded IDs of information picture that the information picture recording section 1605 (i.e., this client) has recorded or updated. In this case, ID 1703 of information picture described at the lower portion in the figure is caused to be information (information picture A) for specifying information picture recorded near at information picture recording section 1605. Namely, in this figure, it is indicated that recording/updating has been carried out in order of information picture D<C<F<B<A.

In this example, since pointer makes indication in such a manner that ID of lately recorded/updated information picture is recorded at the lowermost portion, when new information picture N is recorded in updating history recording section 1612 here, order of the list is changed. As a result, the information picture N is registered as the latest information picture 1704, and is recorded (1702) in such a manner that it has been recorded/updated in order of information picture C<F<B<A<N. In this case, with respect to ID of the oldest information picture that this updating history recording section 1612 has recorded, it is sufficient to disuse or supercede such ID from this recording section.

Further, the updating history recording section 1612 can grasp position where specific information picture is recorded in the state where it is spaced from the nearest information picture. Accordingly, by this function, it is possible to grasp that specific information picture corresponds to position of latest recording/updating, and it is possible to make judgment as to whether or not specific information picture exists within a predetermined number of information pictures from the nearest information picture.

The explanation returns to the configuration of client.

The operation permission/negation section 1613 is connected to the updating history recording section 1612, and is adapted to make reference to information of the updating information recording section 1612, and to determine permission/negation of operation of the operation determining section 1609 connected to output, whereby in the case where the operation is judged to be permitted, it makes judgment so as to carry out operation based on its related information, while in the case where the operation is judged to be negated, it makes determination so as not to conduct operation.

Here, with respect to determination of permission/negation of the operation, since it is possible to make judgment in the updating history recording section 1612 as to whether or not recording/updating is carried out within at least a predetermined number of information pictures from the nearest information picture, it is judged by this function that in the case where recording/updating is carried out within the predetermined number of information pictures from the nearest information, the operation is judged to be permitted, while in the case where recording/updating is carried out at time older than that, the operation is judged to be negated.

It is to be noted that it is desirable to notify judgment result by the operation permission/negation section 1613 to the updating iso-information picture acquisition section 1604 so that updating is not carried out with respect to the information picture in which the operation is negated.

(2.2.3. Example of Operation of Client)

Figure 16:
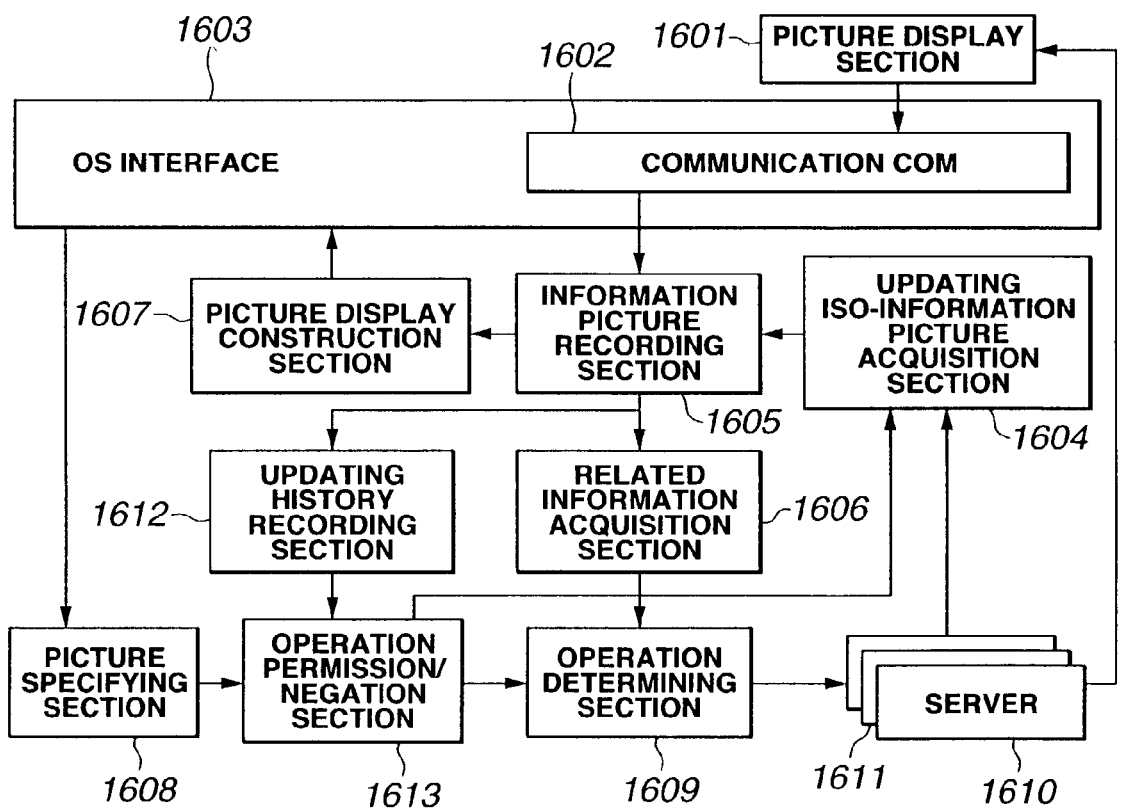
FIG. 16 is a view showing an example of the configuration of client when communication is limited on the basis of history from the time when information picture is registered at client.

The operation in the case where the client is constituted as shown in FIG. 16 will now be described. An operator of the client acquires page information including information picture from the information picture providing server 1610 to allow the picture display section 1601 to display such information. At this time, in the case where internet explorer is used at the picture display section, such an operation to display WEB page of server by HTTP protocol is carried out. In this case, even if there is employed picture display section utilizing other browser or different protocol, picture display section capable of acquiring information picture from server to display may be employed.

Further, when a person who carries out operation of client looks at displayed picture image to determine picture desired to be recorded in the second management area, operation for shifting this picture image into the second management area is carried out by drag and drop, etc. At this time, since picture image caused to undergo drag and drop is information picture, such picture image is recorded into the information picture recording section 1605 through the communication COM 1602. At this time, together, by action of the related information acquisition section 1606, notification to the effect that corresponding information picture is registered into the second management area is made with respect to the information picture management server 1611 through the operation determining section 1609. Additionally, what operation is carried out by the information picture management server 1611 will be separately described.

On the other hand, information picture recorded in information picture recording section 1605 according to the second management area is displayed with respect to the operator of client through the OS interface 1603 by action of the picture display construction section 1607. Further, when an operator of the client carries out operation on the basis of related information recorded in the displayed information picture, operation relating to this related information is carried out by action of the picture specifying section 1608 and the operation determining section 1609. For example, if URL, etc. of other information picture providing server is included as related information, page name according to this URL is displayed by using pop-up window, etc. to hasten or promote taking-in of other information picture. At this time, if corresponding information picture is information picture recorded in the updating history recording section and within a predetermined number of information pictures from the nearest information picture, the above-mentioned operation is carried out. However, in the case where information picture except for the above is operated, since this information picture already results in information picture without operable number of information pictures, any processing is not carried out. At this time, it is also desirable to employ an approach such that display onto pop-up window is not carried out.

On the other hand, in the case where instruction of updating of information picture to be displayed within the second management area is given from the information picture management server 1611, notification is made with respect to the updating, iso-information picture acquisition section 1604 in a manner accompanying with that information picture to be updated. Accordingly, by this operation, information picture recorded in the information picture recording section 1605 is supplemented or updated.

At this time, in the case where there is employed such an approach that determination result of the operation permission/negation section 1613 is notified to the updating iso-information picture acquisition section 1604 to thereby limit operation of updating, etc. information picture acquisition section 1604, updating operation by the information picture management server is not carried out with respect to information picture in which the operation is negated. On the other hand, updating operation by the information picture management server is carried out with respect to information picture in which operation is permitted.

(2.2.4. Predetermined Number at Updating History Recording Section of Client)

While there has been given the explanation to the effect that information picture within a predetermined number of information pictures from the nearest information picture is object in determining permission/negation of updating or operation in the explanation in connection with the updating information recording section in the client, as given in the explanation of means, this predetermined number may be number determined on program in advance by this information picture utilization apparatus, number determined by setting action of an operator, number determined by the information picture management server, or number determined before permission/negation by any one of these techniques.

Figure 18:
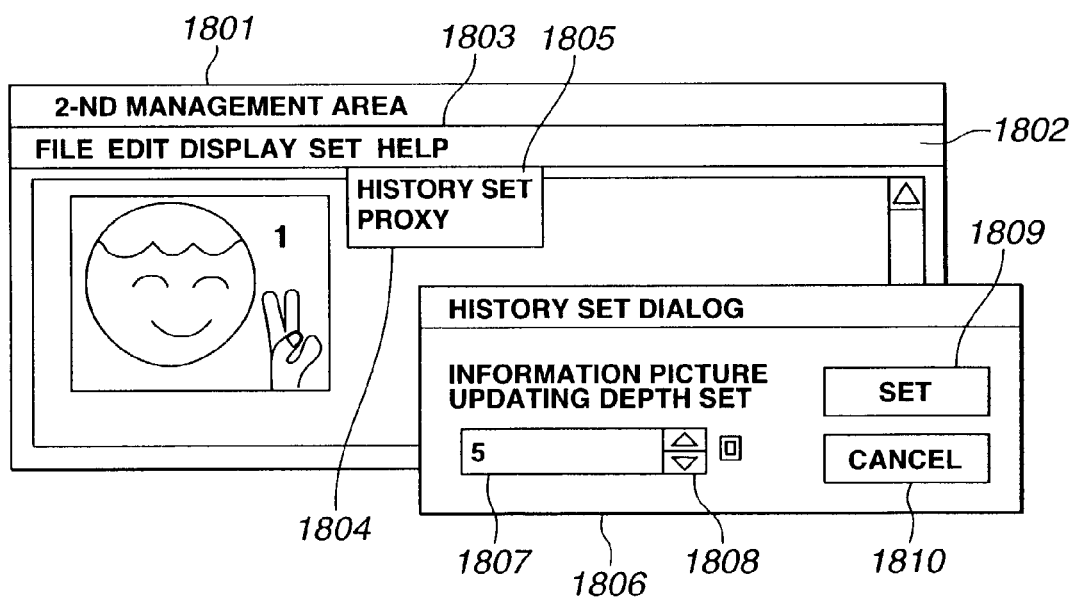
FIG. 18 is a view showing an example of client interface when communication is limited on the basis of history from the time when information picture is registered at client.

Here, user interface suitable in the case where this value is determined by setting action of the operator will be described with reference to FIG. 18. FIG. 18 is a view showing an example of interface for determining depth of history which permits operation of information picture.

In this example, window frame 1801 is user interface for constructing the second management area.

Menu bar 1802 is adapted so that menu utilized when the operator supports processing such as setting, etc. of this second management area is displayed.

Setting item section 1803 is item provided within the menu bar 1802, and is adapted to display pop-up window 1804 by pointing device such as mouse, etc., and to have ability to carry out operation with respect to items described within the pop-up window.

The pop-up menu window 1804 is adapted so that items for carrying out setting with respect to the system, etc. are displayed therewithin, whereby corresponding setting can be made in the case where the operator designates corresponding item by pointing device, etc.

History setting dialog box 1806 is dialog box displayed when history setting item in the pop-up window 1804 is designated by the operator, and is adapted so that depth value for cutting and dividing whether or not corresponding information picture is nearest one can be set in the updating recording section 1612. For this reason, depth designation portion 1807, spin button 1808 for changing this depth value in upper and lower directions, and setting button 1809 and cancel button 1810 for designating whether that value is set or canceled are adapted to be displayed within the history setting dialog box 1806.

In setting depth of history, the operator first clicks setting item portion in the second management area by mouse, etc. to display pop-up window to click history setting item portion therewithin to display history setting dialog box to thereby display that depth. Further, the operator designates this value by the spin button or by directly writing it to push down the setting button so that depth can be determined. This value is delivered to updating history recording section 1612, and functions as criterion as to whether or not updating or operation according to related information is carried out.

(3. Case where Communication is Limited on the Basis of Information Caused to Undergo Management at the Server Side)

Explanation will now be given in connection with the case where communications traffic is limited on the basis of information caused to undergo management at the server side.

(3.1. System Configuration)

Figure 19:
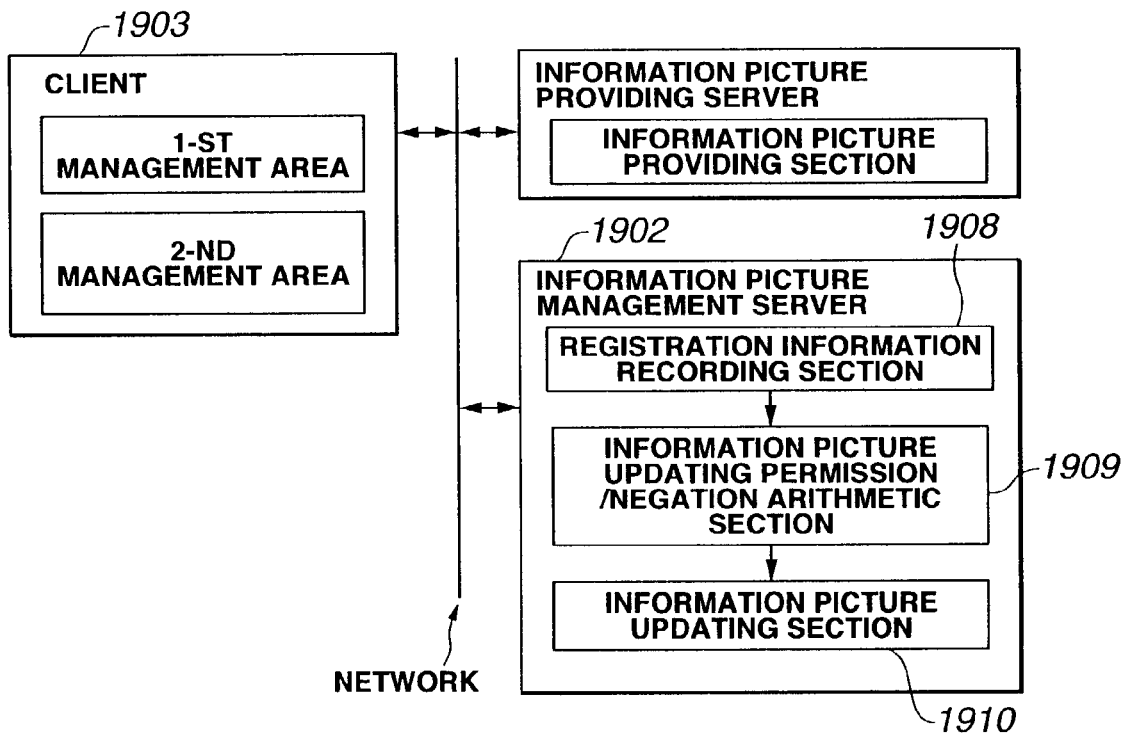
FIG. 19 is a view showing an example of system configuration when communications traffic control is carried out on the basis of information recorded in information picture management server.
Figure 20:
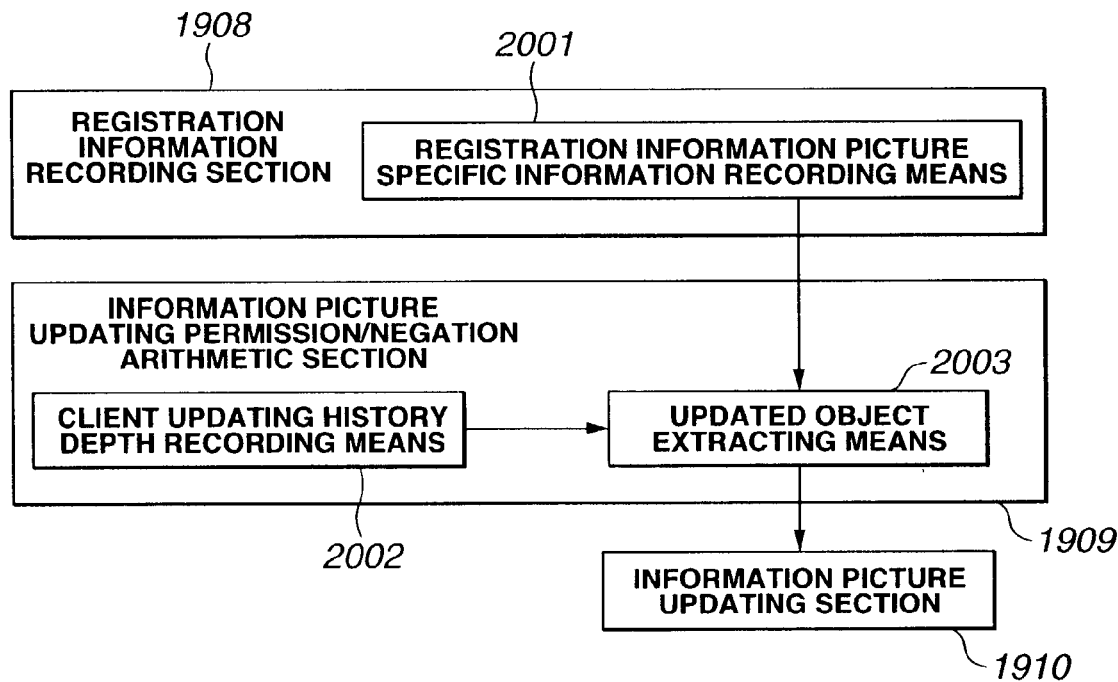
FIG. 20 is a view showing an example of configuration of information picture management server when communications traffic control is carried out on the basis of information recorded in the information picture management server.

As shown in FIGS. 19 and 20, this system is constituted by an information picture providing server, an information picture management server 1902 and a client 1903, wherein respective components become operative in such a manner that they are connected to network.

The system configuration is substantially the same as the previously described system configuration. Here, the information picture providing server and the client which are featured in this embodiment will be described in detail, and description of other servers is omitted.

(3.1.1. Information Picture Management Server 1902)

The information picture management server 1902 (corresponding to the information picture management apparatus of this invention) is connected to network, and includes therewithin a registration information recording section 1908 (corresponding to the registration information recording section of this invention), an information picture updating permission/negation arithmetic section 1909 (corresponding to the updating permission/negation section of this invention), and a reference information picture updating section 1910 (corresponding to the information picture updating section of this invention). In more detail, the information picture management server 1902 is constituted as shown in FIG. 20.

The registration information recording section 1908 includes registration information picture specifying information means 2001. Further, the registration information picture specifying information recording means 2001 may be constituted as means which is the same as the means shown in the previously described data structure (FIG. 25).

The registration information recording section 1908 carries out communication between this server and client directly or indirectly connected thereto so that they can communicate. The reason why direct or indirect connection is employed here is that even if there is employed direct connection irrespective of wire or wireless with respect to network, even if there is employed connection through buffer, etc., or even if there is employed configuration in which gate-way, etc. intervenes as network, it is sufficient if there results in mutually communicable situations. Namely, when at least information picture which existed in the first management area of client is registered into the second management area, notification from the second management area is made. At this time, the registration information recording section 1908 establishes, on the basis of this notification, ID which can individually identify at least client (hereinafter referred to as client ID) 2501 and registered information picture specifying information (i.e., information picture ID) 2502 which is information for specifying registered information picture (e.g., file name of information picture, etc.) to record them into registration information picture specifying information recording means 2001. For this reason, the registration information recording section 1908 functioning as data base is operative so that when inquiry is carried out by using ID of the client, what information picture that client register into the second management are can be grasped. In addition, when inquiry is carried out by using information picture specifying information, what client registers that information picture into the second management information can be grasped.

The registration information picture specifying recording means 2001 is adapted so that registration date 2503 and other information 2504 are together recorded at the same record in addition to the above-mentioned information. At the registration date 2503, date when corresponding information is first registered is recorded and held. In this embodiment, in the case where corresponding information is updated, it is replaced by the updated date. In this case, in place of carrying out such replacement, item of updated date may be provided as other information 2504 separately from the registration date 2503 to carry out recording. Although other information 2504 is not indispensable, information for taking various statistics, etc. may be recorded.

The information picture updating permission/negation arithmetic section 1909 will now be described. The information picture updating permission/negation arithmetic section 1909 includes client updating history depth recording means 2002 and updated object extracting means 2003, and determines information picture updated in accordance with updating condition set in advance of information picture recorded in the registration information picture specifying information recording means 2001 and in which new information picture where a portion or entirety of its content (picture information or related information) has been changed is issued. As the updating condition in this embodiment, there is employed the condition where, with respect to information picture within the range up to number (referred to as "depth" or "history depth" in this embodiment) determined in advance as the result of the fact that order of date recorded in the column of registration date of the registered information picture specifying means 2001 (Accordingly, in this embodiment, in the case where updating is carried out, this date is replaced by updated date) is caused to retrospect from the nearest information picture in point of time, determination is made such that updating is permitted, and with respect to information pictures earlier than that, determination is made such that updating is negated. Depth for this condition is recorded in client updating history depth recording means 2002. The updated object extracting means 2003 extracts registration information caused to undergo updating and determination on the basis of registration date (updated date in the case where updating is carried out) recorded in the registration information picture specifying information recording means 2001 and depth set at the client updating history depth recording means 2002 to notify it to the reference information picture updating section 1910.

It is to be noted that while, in this embodiment, since registration date of information picture recorded in the registration information picture specifying information recording means 2001 is assumed to be replaced by updated date in the case where updating is carried out, information picture to be updated is determined by preceding timing or succeeding timing of date of registration and updating, there may be employed an approach in which such a replacement is not carried out to thereby determine information picture to be updated by preceding timing or succeeding timing of date of the first registration (which does not include updating). In addition, the updating condition is not limited to the above-described condition, but it is needless to say to employ other condition such that the number of information pictures to be updated is limited.

As depth recorded in the client updating history depth recording means 2002, such an approach may be employed to determine that depth in advance from a viewpoint of human engineering, etc. to permanently set it as a portion of program of this information picture management server 1902, or such an approach may be employed to changeably set that depth form console, etc. of this information picture management server 1902. In this case, it is possible to uniformly make setting with respect to respective clients. It is to be noted that, in this embodiment, in order to have ability to flexibly take a countermeasure in accordance with requests of operators of respective clients, client updating history depth recording means 2002 are provided every clients so that change can be arbitrarily made from corresponding client. User interface in this case will be described later.

The reference information picture updating section 1910 will now be described. The reference information picture updating section 1910 carries out a processing to update information picture that a certain client has and notified from the updated object extracting means 2003 into corresponding new information picture. Extracting processing of information picture by the updated object extracting means 2003 and updating processing of information picture by the reference information picture updating section 1910 based thereon are carried out when client that the registration information recording section 1908 records establishes session with respect to this information picture management server 1902. Namely, ID of this client where session is held is confirmed to send out updated information picture by using socket of the session with respect to information picture extracted by the updated object extracting means 2003 (there are instances where there is no information picture to be updated) of information pictures that client corresponding to that client ID records in the second management area.

It is to be noted that when campaign/event in which it is suitable to use this embodiment is carried out, it is advantageous to implement updating particularly to one information picture of plural information pictures that the event sponsor requires the operator of client to particularly collect. For this reason, in this embodiment, corresponding section is not caused to be merely information picture updating section, but is caused to be called "reference" information picture updating section.

(3.1.2. Client)

Client is an information processing apparatus such as personal computer, digital television and PDA (Portable information terminal), etc. connected to network, and form of its connection may be such that client is directly connected by wire, or is connected by wireless, etc. As previously described, the client is adapted so that respective functions of the first management area and the second management area are caused to take place therewithin. In general, these functions are realized by program.

(3.1.2.1. Example of Configuration of Client)

The detail of the client will now be described in detail with reference to FIG. 21.

A picture display section 2101 is, e.g., internet explorer by Microsoft company or netscape navigator by Netscape company, and is adapted so that when down load instruction of information of specific server is given by an operator, it carries out logical connection through network with respect to an information picture providing server 2110 on the basis of that instruction to acquire that information to display it in the first management area.

Further, the second management area may be carried out by constituting, e.g., an updating iso-information picture acquisition section 2104, an information picture recording section 2105, a related information acquisition section 2106, a picture display construction section 2107, a picture specifying section 2108 and an operation determining section 2109.

A communication COM 2102 is communication realization means between processes (or between sleds, which will be the same hereinafter) utilizing Component Object Model which is function of OS, and is adapted so that in the case where user interface operation, e.g., drag and drop, etc. is carried out, it realizes transmission of information from dragged process to dropped process.

The updating iso-information picture acquisition section 2104 is connected to network, and is adapted to receive information picture from an information picture management server 2111 to transfer it to the information picture recording section 2105 of the succeeding stage.

Here, with respect to reception of information picture, there are two techniques.

The first technique employs an approach to inquire the information picture management server 2111 by polling as to whether or not information is updated with respect to information picture recorded in the information picture recording section 2105 which will be described later, whereby in the case where updating is carried out, that information is acquired.

The second technique employs an approach to send out information picture to client of information picture caused to undergo management within the information picture management server 2111 on the basis of information recorded the registration information recording section 1908 constituting the information picture management server 2111 to receive it.

The information picture recording section 2105 is adapted to record information picture notified from the communication COM 2102 or the updating iso-information picture acquisition section 2104 and such that picture information and related information are collected as one handling unit. In this case, in place of making recording as information picture, there may be also employed an approach to respectively record picture information and related information into different memories in the state where they are caused to have relevancy. Further, the information picture recording section 2105 is adapted so that when registration operation of information picture is carried out by drag and drop operation from the first management area to the second management area, it makes notification to the effect that information picture is registered into the second management area to specific server through the related information acquisition section 2106.

The related information acquisition section 2106 is connected to the information picture recording section 2105, and is adapted to acquire only the portion of related information from information picture recorded in the information picture recording section 2105.

The picture display construction section 2107 is connected to the information picture recording section 2105, and is adapted to display all information pictures recorded in the information picture recording section 2105 or to select any one of them to display selected one. Namely, the operator is permitted to perceive picture image according to information picture through the one touch frame (one touch window).

The picture specifying section 2108 is adapted so that in the case where the operator specifies picture image displayed in the second management area by function of OS interface 2103, information picture corresponding to that picture is specified.

The operation determining section 2109 is connected to the picture specifying section 2108 and the related information acquisition section 2106, and is adapted to execute operation on the basis of related information of information picture specified by the operator.

It is to be noted that, in this embodiment, the information picture providing server 2110 and the information picture management server 2111 are respectively the same as the information picture providing server 114 and the information picture management server 116.

(3.1.2.2. Example of Operation of Client)

Figure 21:
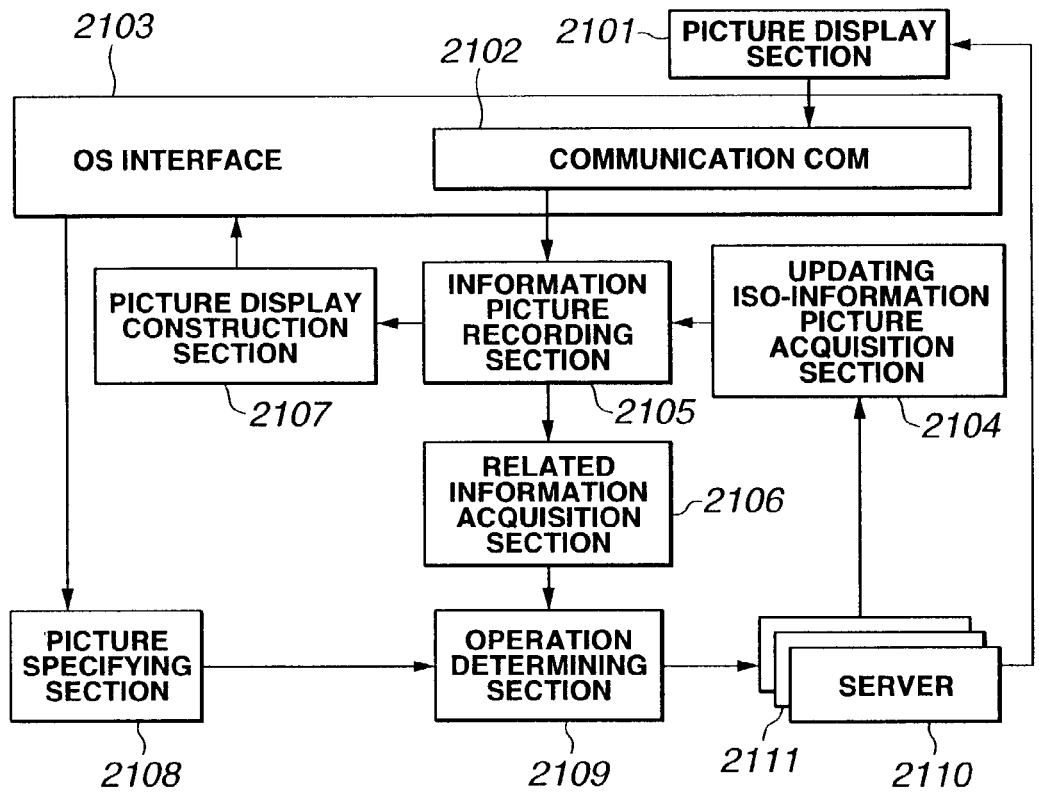
FIG. 21 is a view showing an example of client when communications traffic control is carried out on the basis of information recorded in information picture management server.

The operation in the case where the client is constituted as shown in FIG. 21 will now be described.

An operator of the client acquires page information including information picture from the information picture providing server 2110 to allow the picture display section 2101 to display that page information. At this time, in the case where internet explorer is used at the picture display section, an operation to display WEB page of server is carried out by HTTP protocol. However, even if there is employed a picture display section utilizing other browser or different protocol, a picture display section capable of acquiring information picture from server to display that information picture may be employed.

Further, when a person who carries out operation of the client looks at picture image displayed to determine picture image desired to be recorded in the second management area, there is conducted an operation to shift this picture image to the second management area by drag and drop, etc. At this time, since picture image caused to undergo drag and drop is information picture, that picture image is recorded into the information picture recording section 2105 through the communication COM 2102. At this time, together, by action of the related information acquisition section 2106, notification to the effect that corresponding information picture is registered into the second management area is made to the information picture management server 2111 through the operation determining section 2109. It is to be noted that what operation the information picture management server 2111 carries out will be separately described.

On one hand, information picture recorded in the information picture recording section 2105 according to the second management area is displayed with respect to the operator of the client through the OS interface 2103 by action of the picture display construction section 2107. Further, when the operator of the client carries out operation on the basis of related information recorded in that displayed information picture, operation relating to this related information is carried out by action of the picture specifying section 2108 and the operation determining section 2109. For example, if URL, etc. of other information picture providing server is included as related information, page name according to this URL is displayed by using pop-up window, etc. to hasten or promote taking-in of other information picture.

On the other hand, in the case where instruction of updating of information picture to be displayed within the second management area is given from the information picture management server 2111, notification is made to the updating iso-information acquisition section 2104 in a manner accompanying with that information picture to be updated. Accordingly, information picture recorded in the information picture recording section 2105 is supplemented or updated by this operation.

(3.2. Scenario of Information Picture Registration)

Scenario of information picture registration will now be described with reference to FIG. 23.

When an operator of client 120 moves information picture displayed within the first management area realized by, e.g., internet explorer to the second management area at WEB page including the information picture by operation such as drag and drop, etc. (step 2301), a request for registration of information picture including client ID or picture information ID, etc. is notified from the client 120 to information picture management server 116 (step 2302). The information picture management server 116 which has received this request for registration records, into the registration information picture specifying information recording means (see FIG. 20), its client ID, picture information ID, current day, hour, minute and second as registration date and other information as occasion demands (step 2303) to send notification to the effect that registration of information picture has been completed back to the client 120 (step 2304). Thus, a predetermined operation is carried out with respect to that information picture at the client 120, thereby making it possible to receive providing of various services based on related information of the information picture (step 2305).

(3.3. Information Picture Updating Depth Setting)

While it has been described in the explanation with respect to information picture updating permission/negation section 1909 in the information picture management server that, in determining permission/negation of updating, information pictures within a predetermined number (depth) from the nearest information picture are subject to determination of permission/negation of updating, this predetermined number may be, as given in the explanation of means, number determined in advance on program by this information picture management apparatus, number determined by setting action of an operator, or number determined by the information picture management server, and may be number determined before judgment of permission/negation by any one of techniques.

Figure 22:
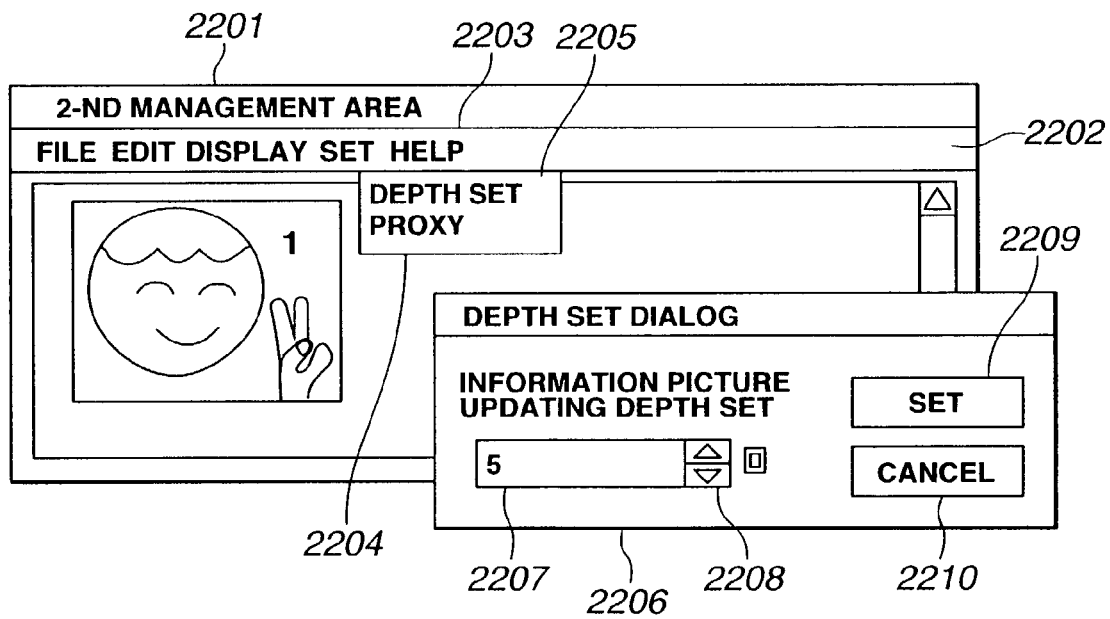
FIG. 22 is a view showing an example of client interface when communications traffic control is carried out on the basis of information recorded in information picture management server.

Here, user interface suitable in the case where this value is determined by setting action of the operator will be described with reference to FIG. 22. FIG. 22 is a view showing an example of interface for determining depth set at the client updating history depth recording means 2002 of the information picture updating permission/negation arithmetic section 1909.

In this example, window frame 2201 is user interface for constructing the second management area.

Menu bar 2202 is adapted so that menu utilized when the operator instructs processing such as setting, etc. of this second management area is displayed.

Setting item section 2203 is item provided within the menu bar 2202, and is adapted to display pop-up window 2204 by pointing device such as mouse, etc. and to permit operation with respect to item described within the pop-up window.

The pop-up menu window 2204 is adapted so that item for carrying out setting with respect to system, etc. is displayed therewithin, and is adapted so that in the case where the operator designates this item by pointing device, etc., corresponding setting can be made.

Depth setting dialog box 2206 is dialog box displayed when depth setting item in the pop-up window 2204 is designated by the operator, and is adapted to have ability to set depth value for determining the boundary between a predetermined number of information pictures to be updated from the nearest information picture and information pictures earlier than that. For this reason, within the depth setting dialog box 2206, there are displayed depth designation section 2207, spin button 2208 for changing this depth value in upper and lower directions, and setting button 2209 and cancel button 2210 for designating whether that value is set or canceled.

In setting depth, the operator first clicks the setting item portion in the second management area by mouse, etc. to display pop-up window to click the depth setting item portion therewithin to display the depth setting dialog box to thereby display that depth. Further, this value is designated by the spin button or is directly written to thereby push down the setting button so that depth can be set. The depth thus set is transferred to the information picture management server, and is recorded into corresponding area of the client updating history depth recording means 2002 provided every clients within the server. Thus, this depth is used for the above-described extracting processing by the updated object extracting means 2003.

Another user interface suitable in the case where depth is determined by setting action of the operator will now be described with reference to FIG. 24. FIG. 24 is a view showing example of interface for determining depth set in the client updating history depth recording means 2002 of information picture updating permission/negation arithmetic section 1909.

This user interface is interface by ordinary WEB page, and is adapted to deliver depth set page in accordance with request from client to input depth optimum for client itself from this page. With respect to this delivery of page, there may be employed, e.g., an approach to deliver in advance information picture in which URL of this depth set page is set as related information to carry out a predetermined operation with respect to this information picture so that such page can be called.

Within this depth setting page 2401, there are displayed client ID, message box 2402, clear button 2403 and registration button 2404. Within the message box 2402, message for hastening or promoting updating of depth is displayed, depth designation 2405 and spin button 2406 for changing this depth in upper and lower directions are displayed.

When the operator calls this depth setting page, this page is displayed in the state where current set value is displayed at the depth designation portion 2405. Accordingly, this value is changed by spin button or by direct writing to click registration button 2404, etc. so that depth can be registered. The depth thus set is transferred to information picture management server, and is recorded into corresponding area of the client updating history depth recording means 2002 provided every clients within the server. Thus, this depth is used for the above-described extracting processing by the updated object extracting means 2003.

(4. Others)

As explained above, such an approach is employed to set limits to operation based on information picture at at least one of server and client, thereby making it possible to reduce network load. Here, in the case where information picture including particularly time limit information is used, notification when information picture is recorded into the second management area may be employed as object to be limited. Further, operation based on related information that information picture includes may be employed. In addition, limitation may be set only to specific one of related information.

INDUSTRIAL APPLICABILITY

This invention uses "information picture" in which picture information and related information to cause a predetermined operation on the basis of this picture information are caused to be one handling unit to thereby allow notification to server carried out when processing operation based on related information included in information picture is carried out to have life time, thereby making it possible to lower communications traffic taking place when information pictures are distributed and duplications are increased with time to suppress increase in load of network.

The invention claimed is:

1. A client apparatus comprising:
an acquisition unit to receive an information picture from an information picture providing server, the information picture including a picture image, related information, and time limit information as a single handling unit,
wherein a predetermined operation is processed as a single unit in response to a related operation command, the predetermined operation being one or more instructions, and corresponds with a respective related information, and
wherein each of a plurality of operations comprise a specific predetermined operation and instructions;
a recording unit to store the single handling unit in a first memory;
a user interface for displaying the picture image and allowing a user to select the picture information which stores the single handling unit in a second memory;
a display control unit to control display, in response to selection of the picture image, at least one related information;
a processor device to execute processing of first corresponding predetermined operation based on the at least one related information, and in the case where there exist plural related information, executing processing second corresponding predetermined operation based on a selected one of the related information;
a notifying unit for notifying a server that a client received and stored the single handling unit of information picture and related information; and
a history recording unit for recording history of recording of the information picture;
an updating permission/negation unit for determining permission/negation of updating of the related information in accordance with updating condition information, the updating condition information includes the history recorded in the history recording unit,
wherein the information picture is a plurality of related information represented by a single picture image and the related information is links to an information provider such that selection of the single picture image cyclically guides a user through plurality of related information.

2. A non-transitory computer-readable medium for storing a program for allowing a computer to execute a data processing method, said method comprising the steps of:
receiving an information picture from an information picture providing server, the information picture including a picture image, related information, and time limit information as a single handling unit,
wherein a predetermined operation is processed as a single unit in response to a related operation command, the predetermined operation being one or more instructions, and corresponds with a respective related information, and
wherein each of a plurality of operations comprise a specific predetermined operation and instructions;
storing the single handling unit in a first memory;
displaying the picture image;
receiving input from the user selecting the picture image;
controlling the display, in response to selection of the picture image, of at least one related information;
executing processing of first corresponding predetermined operation based on the at least one related information, and in the case where there exist plural related information, executing processing second corresponding predetermined operation based on a selected one of the related information;
storing the single handling unit in a second memory in response to the input from a user selecting the picture information;
notifying a server that a client received and stored the single handling unit of information picture and related information;
recording history of recording of the information picture;
updating relating information in accordance with updating condition information; and
determining permission/negation of the updating step in accordance with the updating condition information, the updating condition information including the recorded history of the information picture,
wherein the information picture is a plurality of related information represented by a single picture image and the related information is links to an information provider such that selection of the single picture image cyclically guides a user through plurality of related information.

* * * * *